(12) United States Patent
Kasada

(10) Patent No.: US 10,424,330 B2
(45) Date of Patent: *Sep. 24, 2019

(54) MAGNETIC TAPE HAVING CHARACTERIZED BACK COATING LAYER

(71) Applicant: FUJIFILM Corporation, Tokyo (JP)

(72) Inventor: Norihito Kasada, Minami-ashigara (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/900,164

(22) Filed: Feb. 20, 2018

(65) Prior Publication Data
US 2018/0240492 A1  Aug. 23, 2018

(30) Foreign Application Priority Data

Feb. 20, 2017  (JP) .................................. 2017-029501

(51) Int. Cl.
| | | |
|---|---|---|
| *G11B 5/735* | (2006.01) | |
| *G11B 5/712* | (2006.01) | |
| *G11B 5/708* | (2006.01) | |
| *G11B 5/78* | (2006.01) | |

(52) U.S. Cl.
CPC .............. *G11B 5/712* (2013.01); *G11B 5/708* (2013.01); *G11B 5/735* (2013.01); *G11B 5/78* (2013.01)

(58) Field of Classification Search
None
See application file for complete search history.

(56) References Cited

U.S. PATENT DOCUMENTS

| | | | |
|---|---|---|---|
| 3,966,686 A | 6/1976 | Asakura et al. | |
| 4,112,187 A | 9/1978 | Asakura et al. | |
| 4,425,404 A | 1/1984 | Suzuki et al. | |
| 4,693,930 A | 9/1987 | Kuo et al. | |

(Continued)

FOREIGN PATENT DOCUMENTS

| | | |
|---|---|---|
| DE | 101 46 429 A1 | 3/2002 |
| GB | 2495356 A | 4/2013 |

(Continued)

OTHER PUBLICATIONS

Office Action dated Apr. 26, 2017 which issued during the prosecution of U.S. Appl. No. 15/388,864.

(Continued)

*Primary Examiner* — Kevin M Bernatz
(74) *Attorney, Agent, or Firm* — Sughrue Mion, PLLC

(57) ABSTRACT

A magnetic tape includes a back coating layer having a thickness less than or equal to 0.30 μm and containing fatty acid ester. The logarithmic decrement acquired by a pendulum viscoelasticity test performed regarding the surface of the back coating layer is less than or equal to 0.060. The full width at half maximum of spacing distribution measured by optical interferometry regarding the surface of the back coating layer before and after performing a vacuum heating with respect to the magnetic tape is respectively greater than 0 nm and less than or equal to 10.0 nm, and the difference between the spacing measured by optical interferometry regarding the surface of the back coating layer after performing the vacuum heating and the spacing measured before performing the vacuum heating is greater than 0 nm and less than or equal to 8.0 nm.

10 Claims, 4 Drawing Sheets

(56) References Cited

U.S. PATENT DOCUMENTS

| | | |
|---|---|---|
| 4,746,569 A | 5/1988 | Takahashi et al. |
| 4,825,317 A | 4/1989 | Rausch |
| 5,242,752 A | 9/1993 | Isobe et al. |
| 5,419,938 A | 5/1995 | Kagotani et al. |
| 5,445,881 A | 9/1995 | Irie |
| 5,474,814 A | 12/1995 | Komatsu et al. |
| 5,496,607 A | 3/1996 | Inaba et al. |
| 5,540,957 A | 7/1996 | Ueda et al. |
| 5,585,032 A | 12/1996 | Nakata et al. |
| 5,645,917 A | 7/1997 | Ejiri et al. |
| 5,689,384 A | 11/1997 | Albrecht et al. |
| 5,728,454 A | 3/1998 | Inaba et al. |
| 5,786,074 A | 6/1998 | Soui |
| 5,827,600 A | 10/1998 | Ejiri et al. |
| 6,099,957 A | 8/2000 | Yamamoto et al. |
| 6,183,606 B1 | 2/2001 | Kuo et al. |
| 6,207,252 B1 | 3/2001 | Shimomura |
| 6,228,461 B1 | 5/2001 | Sueki et al. |
| 6,254,964 B1 | 7/2001 | Saito et al. |
| 6,261,647 B1 | 7/2001 | Komatsu et al. |
| 6,268,043 B1 | 7/2001 | Koizumi et al. |
| 6,496,328 B1 | 12/2002 | Dugas |
| 6,579,826 B2 | 6/2003 | Furuya et al. |
| 6,649,256 B1 | 11/2003 | Buczek et al. |
| 6,686,022 B2 | 2/2004 | Takano et al. |
| 6,770,359 B2 | 8/2004 | Masaki |
| 6,791,803 B2 | 9/2004 | Saito et al. |
| 6,835,461 B1 | 12/2004 | Yamagata et al. |
| 6,893,746 B1 | 5/2005 | Kirino et al. |
| 6,921,592 B2 | 7/2005 | Tani et al. |
| 6,939,606 B2 | 9/2005 | Hashimoto et al. |
| 6,950,269 B1 | 9/2005 | Johnson |
| 6,994,925 B2 | 2/2006 | Masaki |
| 7,014,927 B2 | 3/2006 | Sueki et al. |
| 7,029,726 B1 | 4/2006 | Chen et al. |
| 7,153,366 B1 | 12/2006 | Chen et al. |
| 7,255,908 B2 | 8/2007 | Ishikawa et al. |
| 7,511,907 B2 | 3/2009 | Dugas et al. |
| 7,515,383 B2 | 4/2009 | Saito et al. |
| 7,803,471 B1 | 9/2010 | Ota et al. |
| 7,839,599 B2 | 11/2010 | Bui et al. |
| 8,000,057 B2 | 8/2011 | Bui et al. |
| 8,279,739 B2 | 10/2012 | Kanbe et al. |
| 8,524,108 B2 | 9/2013 | Hattori |
| 8,535,817 B2 | 9/2013 | Imaoka |
| 8,576,510 B2 | 11/2013 | Cherubini et al. |
| 8,681,451 B2 | 3/2014 | Harasawa et al. |
| 9,105,294 B2 | 8/2015 | Jensen et al. |
| 9,311,946 B2 | 4/2016 | Tanaka et al. |
| 9,495,985 B2 | 10/2016 | Xia et al. |
| 9,530,444 B2 | 12/2016 | Kasada |
| 9,542,967 B2 | 1/2017 | Sekiguchi et al. |
| 9,564,161 B1 | 2/2017 | Cherubini et al. |
| 9,601,146 B2 | 3/2017 | Kasada et al. |
| 9,704,425 B2 | 7/2017 | Zhang et al. |
| 9,704,525 B2 | 7/2017 | Kasada |
| 9,704,527 B2 | 7/2017 | Kasada |
| 9,711,174 B2 | 7/2017 | Kasada et al. |
| 9,721,605 B2 | 8/2017 | Oyanagi et al. |
| 9,721,606 B2 | 8/2017 | Kasada |
| 9,721,607 B2 | 8/2017 | Tada et al. |
| 9,748,026 B2 | 8/2017 | Shirata |
| 9,773,519 B2 | 9/2017 | Kasada et al. |
| 9,779,772 B1 | 10/2017 | Kasada et al. |
| 9,837,116 B2 | 12/2017 | Ozawa et al. |
| 9,959,894 B2 | 5/2018 | Omura |
| 9,972,351 B1 | 5/2018 | Kaneko et al. |
| 9,978,414 B1 | 5/2018 | Kaneko et al. |
| 9,984,710 B2 * | 5/2018 | Kasada ............... G11B 5/68 |
| 9,984,712 B1 | 5/2018 | Ozawa |
| 9,984,716 B1 | 5/2018 | Kaneko et al. |
| 10,008,230 B1 | 6/2018 | Ozawa et al. |
| 10,026,430 B2 | 7/2018 | Kasada et al. |
| 10,026,433 B2 | 7/2018 | Kasada et al. |
| 10,026,434 B2 | 7/2018 | Oyanagi et al. |
| 10,026,435 B2 * | 7/2018 | Kasada ............... G11B 5/78 |
| 10,062,403 B1 | 8/2018 | Kasada et al. |
| 10,074,393 B2 | 9/2018 | Kaneko et al. |
| 10,134,433 B2 | 11/2018 | Kasada et al. |
| 10,170,144 B2 | 1/2019 | Ozawa et al. |
| 2001/0038928 A1 | 11/2001 | Nakamigawa et al. |
| 2001/0053458 A1 | 12/2001 | Suzuki et al. |
| 2002/0072472 A1 | 7/2002 | Furuya et al. |
| 2002/0122339 A1 | 9/2002 | Takano et al. |
| 2003/0059649 A1 | 3/2003 | Saliba et al. |
| 2003/0091866 A1 | 5/2003 | Ejiri et al. |
| 2003/0124386 A1 | 7/2003 | Masaki |
| 2003/0170498 A1* | 9/2003 | Inoue ............... G11B 5/735 |
| | | 428/845.4 |
| 2003/0228493 A1 | 12/2003 | Doushita et al. |
| 2004/0018388 A1 | 1/2004 | Kitamura et al. |
| 2004/0053074 A1 | 3/2004 | Jingu et al. |
| 2004/0197605 A1 | 10/2004 | Seki et al. |
| 2004/0213948 A1 | 10/2004 | Saito et al. |
| 2004/0218304 A1 | 11/2004 | Goker et al. |
| 2004/0265643 A1 | 12/2004 | Ejiri |
| 2005/0057838 A1 | 3/2005 | Ohtsu |
| 2005/0153170 A1 | 7/2005 | Inoue et al. |
| 2005/0196645 A1 | 9/2005 | Doi et al. |
| 2005/0260456 A1 | 11/2005 | Hanai et al. |
| 2005/0260459 A1 | 11/2005 | Hanai et al. |
| 2005/0264935 A1 | 12/2005 | Sueki et al. |
| 2006/0008681 A1 | 1/2006 | Hashimoto et al. |
| 2006/0035114 A1 | 2/2006 | Kuse et al. |
| 2006/0056095 A1 | 3/2006 | Saitou |
| 2006/0068232 A1 | 3/2006 | Mikamo et al. |
| 2006/0187589 A1 | 8/2006 | Harasawa et al. |
| 2006/0232883 A1 | 10/2006 | Biskeborn et al. |
| 2007/0009769 A1 | 1/2007 | Kanazawa |
| 2007/0020489 A1 | 1/2007 | Yamazaki et al. |
| 2007/0020490 A1 | 1/2007 | Harasawa et al. |
| 2007/0224456 A1 | 9/2007 | Murao et al. |
| 2007/0230054 A1 | 10/2007 | Takeda et al. |
| 2007/0231606 A1 | 10/2007 | Hanai |
| 2008/0057351 A1 | 3/2008 | Meguro et al. |
| 2008/0144211 A1 | 6/2008 | Weber et al. |
| 2008/0152956 A1 | 6/2008 | Murayama et al. |
| 2008/0174897 A1 | 7/2008 | Bates et al. |
| 2008/0297950 A1 | 12/2008 | Noguchi et al. |
| 2008/0311308 A1 | 12/2008 | Lee et al. |
| 2009/0027812 A1 | 1/2009 | Noguchi et al. |
| 2009/0087689 A1 | 4/2009 | Doushita et al. |
| 2009/0161249 A1 | 6/2009 | Takayama et al. |
| 2009/0162701 A1 | 6/2009 | Jensen et al. |
| 2010/0000966 A1 | 1/2010 | Kamata et al. |
| 2010/0035086 A1 | 2/2010 | Inoue et al. |
| 2010/0035088 A1 | 2/2010 | Inoue |
| 2010/0053810 A1 | 3/2010 | Biskeborn et al. |
| 2010/0073816 A1 | 3/2010 | Komori et al. |
| 2010/0081011 A1 | 4/2010 | Nakamura |
| 2010/0134929 A1 | 6/2010 | Ito |
| 2010/0227201 A1 | 9/2010 | Sasaki et al. |
| 2010/0246073 A1 | 9/2010 | Katayama |
| 2011/0003241 A1 | 1/2011 | Kaneko et al. |
| 2011/0051280 A1 | 3/2011 | Karp et al. |
| 2011/0052908 A1 | 3/2011 | Imaoka |
| 2011/0077902 A1 | 3/2011 | Awezec et al. |
| 2011/0151281 A1 | 6/2011 | Inoue |
| 2011/0244272 A1 | 10/2011 | Suzuki et al. |
| 2012/0045664 A1 | 2/2012 | Tanaka et al. |
| 2012/0177951 A1 | 7/2012 | Yamazaki et al. |
| 2012/0183811 A1 | 7/2012 | Hattori et al. |
| 2012/0196156 A1 | 8/2012 | Suzuki |
| 2012/0243120 A1 | 9/2012 | Harasawa et al. |
| 2012/0244387 A1 | 9/2012 | Mori et al. |
| 2012/0251845 A1 | 10/2012 | Wang et al. |
| 2013/0029183 A1 | 1/2013 | Omura et al. |
| 2013/0084470 A1 | 4/2013 | Hattori et al. |
| 2013/0088794 A1 | 4/2013 | Cherubini et al. |
| 2013/0256584 A1 | 10/2013 | Yamazaki et al. |
| 2013/0260179 A1 | 10/2013 | Kasada et al. |
| 2013/0279040 A1 | 10/2013 | Cideciyan et al. |
| 2013/0286510 A1 | 10/2013 | Rothermel et al. |
| 2014/0011055 A1 | 1/2014 | Suzuki et al. |

(56) References Cited

U.S. PATENT DOCUMENTS

| | | |
|---|---|---|
| 2014/0130067 A1 | 5/2014 | Madison et al. |
| 2014/0139944 A1 | 5/2014 | Johnson et al. |
| 2014/0272474 A1 | 9/2014 | Kasada |
| 2014/0295214 A1 | 10/2014 | Tada et al. |
| 2014/0342189 A1 | 11/2014 | Tachibana et al. |
| 2014/0366990 A1 | 12/2014 | Lai et al. |
| 2014/0374645 A1 | 12/2014 | Kikuchi et al. |
| 2015/0043101 A1 | 2/2015 | Biskeborn et al. |
| 2015/0098149 A1 | 4/2015 | Bates et al. |
| 2015/0111066 A1 | 4/2015 | Terakawa et al. |
| 2015/0123026 A1 | 5/2015 | Masada et al. |
| 2015/0302879 A1 | 10/2015 | Holmberg et al. |
| 2015/0380036 A1 | 12/2015 | Kasada et al. |
| 2016/0061447 A1 | 3/2016 | Kobayashi |
| 2016/0064025 A1 | 3/2016 | Kurokawa et al. |
| 2016/0092315 A1 | 3/2016 | Ashida et al. |
| 2016/0093321 A1 | 3/2016 | Aoshima et al. |
| 2016/0093322 A1 | 3/2016 | Kasada et al. |
| 2016/0093323 A1 | 3/2016 | Omura |
| 2016/0180875 A1 | 6/2016 | Tanaka et al. |
| 2016/0189739 A1 | 6/2016 | Kasada et al. |
| 2016/0189740 A1 | 6/2016 | Oyanagi et al. |
| 2016/0247530 A1 | 8/2016 | Kasada |
| 2016/0260449 A1 | 9/2016 | Ahmad et al. |
| 2016/0276076 A1 | 9/2016 | Kasada |
| 2017/0032812 A1 | 2/2017 | Kasada |
| 2017/0053669 A1 | 2/2017 | Kasada |
| 2017/0053670 A1 | 2/2017 | Oyanagi et al. |
| 2017/0053671 A1 | 2/2017 | Kasada et al. |
| 2017/0058227 A1 | 3/2017 | Kondo et al. |
| 2017/0092315 A1 | 3/2017 | Ozawa et al. |
| 2017/0130156 A1 | 5/2017 | Kondo et al. |
| 2017/0178675 A1 | 6/2017 | Kasada |
| 2017/0178676 A1 | 6/2017 | Kasada |
| 2017/0178677 A1 | 6/2017 | Kasada |
| 2017/0186456 A1 | 6/2017 | Tada et al. |
| 2017/0186460 A1 | 6/2017 | Kasada et al. |
| 2017/0221513 A1 | 8/2017 | Hiroi et al. |
| 2017/0221516 A1* | 8/2017 | Oyanagi .............. G11B 5/70 |
| 2017/0221517 A1* | 8/2017 | Ozawa .............. G11B 5/70 |
| 2017/0249963 A1 | 8/2017 | Oyanagi et al. |
| 2017/0249964 A1 | 8/2017 | Kasada et al. |
| 2017/0249965 A1 | 8/2017 | Kurokawa et al. |
| 2017/0249966 A1 | 8/2017 | Tachibana et al. |
| 2017/0287517 A1 | 10/2017 | Hosoya et al. |
| 2017/0337944 A1 | 11/2017 | Biskeborn et al. |
| 2017/0355022 A1 | 12/2017 | Kaneko et al. |
| 2017/0358318 A1 | 12/2017 | Kasada et al. |
| 2017/0372726 A1 | 12/2017 | Kasada et al. |
| 2017/0372727 A1 | 12/2017 | Kasada et al. |
| 2017/0372736 A1 | 12/2017 | Kaneko et al. |
| 2017/0372737 A1 | 12/2017 | Oyanagi et al. |
| 2017/0372738 A1 | 12/2017 | Kasada |
| 2017/0372739 A1 | 12/2017 | Ozawa et al. |
| 2017/0372740 A1 | 12/2017 | Ozawa et al. |
| 2017/0372741 A1* | 12/2017 | Kurokawa .............. G11B 5/735 |
| 2017/0372742 A1 | 12/2017 | Kaneko et al. |
| 2017/0372743 A1 | 12/2017 | Kasada et al. |
| 2017/0372744 A1 | 12/2017 | Ozawa et al. |
| 2018/0061446 A1 | 3/2018 | Kasada |
| 2018/0061447 A1* | 3/2018 | Kasada .............. G11B 5/78 |
| 2018/0082710 A1 | 3/2018 | Tada et al. |
| 2018/0137887 A1 | 5/2018 | Sekiguchi et al. |
| 2018/0182417 A1 | 6/2018 | Kaneko et al. |
| 2018/0182422 A1 | 6/2018 | Kawakami et al. |
| 2018/0182425 A1 | 6/2018 | Kasada et al. |
| 2018/0182426 A1 | 6/2018 | Ozawa et al. |
| 2018/0182427 A1 | 6/2018 | Kasada et al. |
| 2018/0182428 A1 | 6/2018 | Kasada et al. |
| 2018/0182429 A1 | 6/2018 | Kasada et al. |
| 2018/0182430 A1 | 6/2018 | Ozawa et al. |
| 2018/0240475 A1 | 8/2018 | Kasada |
| 2018/0240476 A1 | 8/2018 | Kasada et al. |
| 2018/0240478 A1 | 8/2018 | Kasada et al. |
| 2018/0240479 A1 | 8/2018 | Kasada et al. |
| 2018/0240481 A1 | 8/2018 | Kasada et al. |
| 2018/0240488 A1* | 8/2018 | Kasada .............. G11B 5/72 |
| 2018/0240489 A1 | 8/2018 | Kasada et al. |
| 2018/0240490 A1 | 8/2018 | Kurokawa et al. |
| 2018/0240491 A1 | 8/2018 | Ozawa et al. |
| 2018/0240492 A1 | 8/2018 | Kasada |
| 2018/0240493 A1 | 8/2018 | Tada et al. |
| 2018/0240494 A1* | 8/2018 | Kurokawa .............. G11B 5/712 |
| 2018/0240495 A1 | 8/2018 | Kasada |
| 2018/0286439 A1 | 10/2018 | Ozawa et al. |
| 2018/0286442 A1 | 10/2018 | Ozawa et al. |
| 2018/0286443 A1 | 10/2018 | Ozawa et al. |
| 2018/0286444 A1 | 10/2018 | Kasada et al. |
| 2018/0286446 A1 | 10/2018 | Ozawa et al. |
| 2018/0286447 A1 | 10/2018 | Ozawa et al. |
| 2018/0286448 A1 | 10/2018 | Ozawa et al. |
| 2018/0286449 A1 | 10/2018 | Kasada et al. |
| 2018/0286450 A1 | 10/2018 | Kasada et al. |
| 2018/0286451 A1 | 10/2018 | Ozawa et al. |
| 2018/0286452 A1 | 10/2018 | Ozawa et al. |
| 2018/0286453 A1 | 10/2018 | Kasada et al. |
| 2018/0301165 A1 | 10/2018 | Oyanagi et al. |
| 2018/0350398 A1 | 12/2018 | Kawakami et al. |
| 2018/0350400 A1 | 12/2018 | Kaneko et al. |
| 2018/0358042 A1 | 12/2018 | Kasada et al. |
| 2018/0374507 A1 | 12/2018 | Kasada |
| 2019/0027167 A1 | 1/2019 | Tada et al. |
| 2019/0027168 A1 | 1/2019 | Kasada et al. |
| 2019/0027171 A1 | 1/2019 | Kasada |
| 2019/0027172 A1 | 1/2019 | Kasada |
| 2019/0027174 A1 | 1/2019 | Tada et al. |
| 2019/0027175 A1 | 1/2019 | Kurokawa et al. |
| 2019/0027176 A1 | 1/2019 | Kurokawa et al. |
| 2019/0027177 A1 | 1/2019 | Kasada |
| 2019/0027178 A1 | 1/2019 | Kasada |
| 2019/0027179 A1 | 1/2019 | Ozawa et al. |
| 2019/0027180 A1* | 1/2019 | Kasada .............. G11B 5/735 |
| 2019/0027181 A1* | 1/2019 | Ozawa .............. G11B 5/70 |
| 2019/0035424 A1 | 1/2019 | Endo |
| 2019/0051325 A1 | 2/2019 | Kasada et al. |
| 2019/0088278 A1 | 3/2019 | Kasada et al. |
| 2019/0096437 A1 | 3/2019 | Ozawa et al. |
| 2019/0103130 A1 | 4/2019 | Kasada et al. |
| 2019/0103131 A1 | 4/2019 | Kasada et al. |
| 2019/0103133 A1 | 4/2019 | Ozawa et al. |
| 2019/0103134 A1 | 4/2019 | Kasada et al. |
| 2019/0103135 A1 | 4/2019 | Ozawa et al. |
| 2019/0130936 A1 | 5/2019 | Kaneko et al. |

FOREIGN PATENT DOCUMENTS

| | | |
|---|---|---|
| JP | 61-11924 A | 1/1986 |
| JP | 61-139923 A | 6/1986 |
| JP | 61-139932 A | 6/1986 |
| JP | 63-129519 A | 6/1988 |
| JP | 63-249932 A | 10/1988 |
| JP | 01-060819 A | 3/1989 |
| JP | 64-57422 A | 3/1989 |
| JP | 5-258283 A | 10/1993 |
| JP | 5-298653 A | 11/1993 |
| JP | 7-57242 A | 3/1995 |
| JP | 11-110743 A | 4/1999 |
| JP | 11-175949 A | 7/1999 |
| JP | 11-273051 A | 10/1999 |
| JP | 2000-251240 A | 9/2000 |
| JP | 2002-157726 A | 5/2002 |
| JP | 2002-329605 A | 11/2002 |
| JP | 2002-367142 A | 12/2002 |
| JP | 2002-367318 A | 12/2002 |
| JP | 2003-77116 A | 3/2003 |
| JP | 2003-323710 A | 11/2003 |
| JP | 2004-005820 A | 1/2004 |
| JP | 2004-133997 A | 4/2004 |
| JP | 2004-185676 A | 7/2004 |
| JP | 2005-038579 A | 2/2005 |
| JP | 2005-243063 A | 9/2005 |
| JP | 2005-243162 A | 9/2005 |
| JP | 2006-92672 A | 4/2006 |
| JP | 2006-286114 A | 10/2006 |

(56) References Cited

FOREIGN PATENT DOCUMENTS

| JP | 2007-273039 A | 10/2007 |
|---|---|---|
| JP | 2007-287310 A | 11/2007 |
| JP | 2007-297427 A | 11/2007 |
| JP | 2008-243317 A | 10/2008 |
| JP | 2009-283082 A | 12/2009 |
| JP | 2010-49731 A | 3/2010 |
| JP | 2011-48878 A | 3/2011 |
| JP | 2011-138566 A | 7/2011 |
| JP | 2011-210288 A | 10/2011 |
| JP | 2011-225417 A | 11/2011 |
| JP | 2012-38367 A | 2/2012 |
| JP | 2012-43495 A | 3/2012 |
| JP | 2012-203955 A | 10/2012 |
| JP | 2013-25853 A | 2/2013 |
| JP | 2013-77360 A | 4/2013 |
| JP | 2013-164889 A | 8/2013 |
| JP | 2014-15453 A | 1/2014 |
| JP | 2014-179149 A | 9/2014 |
| JP | 2015-39801 A | 3/2015 |
| JP | 2015-111484 A | 6/2015 |
| JP | 2016-15183 A | 1/2016 |
| JP | 2016-051493 A | 4/2016 |
| JP | 2016-71926 A | 5/2016 |
| JP | 2016-139451 A | 8/2016 |

OTHER PUBLICATIONS

Office Action dated Aug. 10, 2017, which issued during the prosecution of U.S. Appl. No. 14/870,618.
Office Action dated Aug. 3, 2018 which issued during the prosecution of U.S. Appl. No. 15/388,911.
Office Action dated Feb. 4, 2016 which issued during the prosecution of U.S. Appl. No. 14/753,227.
Office Action dated Jun. 7, 2018 which issued during the prosecution of U.S. Appl. No. 15/380,309.
Office Action dated May 2, 2018, which issued during the prosecution of U.S. Appl. No. 15/280,195.
Office Action dated May 4, 2018, which issued during the prosecution of U.S. Appl. No. 15/422,944.
Office Action dated May 4, 2018, which issued during the prosecution of U.S. Appl. No. 15/625,428.
Office Action dated May 7, 2018, which issued during the prosecution of U.S. Appl. No. 15/624,792.
Office Action dated May 7, 2018, which issued during the prosecution of U.S. Appl. No. 15/624,897.
Office Action dated May 7, 2018, which issued during the prosecution of U.S. Appl. No. 15/626,832.
Office Action dated Nov. 16, 2016 which issued during the prosecution of U.S. Appl. No. 15/072,550.
Office Action dated Oct. 12, 2018, which issued during the prosecution of U.S. Appl. No. 15/626,355.
Office Action dated Oct. 12, 2018, which issued during the prosecution of U.S. Appl. No. 15/627,696.
Office Action dated Oct. 15, 2018, which issued during the prosecution of U.S. Appl. No. 15/619,012.
Office Action dated Oct. 22, 2018, which issued during the prosecution of U.S. Appl. No. 15/854,439.
Office Action dated Oct. 9, 2018, which issued during the prosecution of U.S. Appl. No. 15/628,814.
Office Action dated Sep. 24, 2018, which issued during the prosecution of U.S. Appl. No. 15/690,400.
Office Action dated Sep. 27, 2018, which issued during the prosecution of U.S. Appl. No. 15/690,906.
Office Action dated Sep. 27, 2018, which issued during the prosecution of U.S. Appl. No. 15/854,383.
Office Action dated Aug. 23, 2018 from the United States Patent and Trademark Office in U.S. Appl. No. 15/614,876.
Office Action dated Aug. 23, 2018 from the United States Patent and Trademark Office in U.S. Appl. No. 15/621,464.
Office Action dated Aug. 23, 2018 from the United States Patent and Trademark Office in U.S. Appl. No. 15/626,720.
Office Action dated Aug. 24, 2018 from the United States Patent and Trademark Office in U.S. Appl. No. 15/620,916.
Office Action dated Aug. 3, 2018 from the United States Patent and Trademark Office in U.S. Appl. No. 15/380,336.
Office Action dated Dec. 5, 2016 from the United States Patent and Trademark Office in U.S. Appl. No. 14/978,834.
Office Action dated Dec. 6, 2016 from the United States Patent and Trademark Office in U.S. Appl. No. 14/757,555.
Office Action dated Jun. 9, 2017 which issued during the prosecution of U.S. Appl. No. 15/388,864.
Office Action dated May 30, 2018 which issued during the prosecution of U.S. Appl. No. 15/388,911.
Office Action dated Nov. 18, 2016 which issued during the prosecution of U.S. Appl. No. 14/753,227.
Office Action dated Aug. 15, 2016 which issued during the prosecution of U.S. Appl. No. 14/753,227.
"Introduction to TMR Magnetic Sensors", Anonymous, Mar. 12, 2015, MR Sensor Technology, pp. 1-5 (Year: 2015).
Notice of Allowance dated Apr. 25, 2017 which issued during the prosecution of U.S. Appl. No. 15/072,550.
Notice of Allowance dated Apr. 27, 2017, which issued during the prosecution of U.S. Appl. No. 15/052,115.
Notice of Allowance dated Apr. 5, 2018, which issued during the prosecution of U.S. Appl. No. 14/867,752.
Notice of Allowance dated Aug. 28, 2018 from the US Patent & Trademark Office in U.S. Appl. No. 15/422,821.
Notice of Allowance dated Aug. 30, 2017, which issued during the prosecution of U.S. Appl. No. 15/466,143.
Notice of Allowance dated Aug. 6, 2018, which issued during the prosecution of U.S. Appl. No. 15/920,768.
Notice of Allowance dated Aug. 9, 2018, which issued during the prosecution of U.S. Appl. No. 15/920,563.
Notice of Allowance dated Dec. 2, 2016 which issued during the prosecution of U.S. Appl. No. 14/753,227.
Notice of Allowance dated Dec. 3, 2018, which issued during the prosecution of U.S. Appl. No. 15/920,518.
Notice of Allowance dated Dec. 4, 2018, which issued during the prosecution of U.S. Appl. No. 15/625,428.
Notice of Allowance dated Feb. 14, 2018, which issued during the prosecution of U.S. Appl. No. 14/870,618.
Notice of Allowance dated Jul. 12, 2017 which issued during the prosecution of U.S. Appl. No. 15/388,864.
Notice of Allowance dated Jul. 13, 2018, which issued during the prosecution of U.S. Appl. No. 15/920,782.
Notice of Allowance dated Jun. 2, 2017, which issued during the prosecution of U.S. Appl. No. 15/218,190.
Notice of Allowance dated Mar. 14, 2018, which issued during the prosecution of U.S. Appl. No. 15/854,474.
Notice of Allowance dated Mar. 16, 2018 which issued during the prosecution of U.S. Appl. No. 15/854,410.
Notice of Allowance dated Mar. 19, 2018, which issued during the prosecution of U.S. Appl. No. 15/378,907.
Notice of Allowance dated Mar. 21, 2018, which issued during the prosecution of U.S. Appl. No. 15/241,286.
Notice of Allowance dated Mar. 21, 2018, which issued during the prosecution of U.S. Appl. No. 15/241,297.
Notice of Allowance dated Mar. 27, 2018, which issued during the prosecution of U.S. Appl. No. 15/241,631.
Notice of Allowance dated May 10, 2018 which issued during the prosecution of U.S. Appl. No. 15/615,871.
Notice of Allowance dated May 8, 2017, which issued during the prosecution of U.S. Appl. No. 14/757,555.
Notice of Allowance dated May 8, 2017, which issued during the prosecution of U.S. Appl. No. 14/978,834.
Notice of Allowance dated Oct. 11, 2018, which issued during the prosecution of U.S. Appl. No. 15/380,336.
Notice of Allowance dated Oct. 11, 2018, which issued during the prosecution of U.S. Appl. No. 15/422,944.
Notice of Allowance dated Oct. 11, 2018, which issued during the prosecution of U.S. Appl. No. 15/624,792.

(56) References Cited

OTHER PUBLICATIONS

Notice of Allowance dated Oct. 11, 2018, which issued during the prosecution of U.S. Appl. No. 15/624,897.
Notice of Allowance dated Oct. 12, 2018, which issued during the prosecution of U.S. Appl. No. 15/626,832.
Notice of Allowance dated Oct. 6, 2016, which issued during the prosecution of U.S. Appl. No. 14/209,065.
Notice of Allowance dated Sep. 24, 2018, which issued during the prosecution of U.S. Appl. No. 15/854,438.
Notice of Allowance dated Sep. 4, 2018, which issued during the prosecution of U.S. Appl. No. 15/625,428.
Notice of Allowance dated Aug. 27, 2018 in U.S. Appl. No. 15/920,635.
Notice of Allowance dated Jan. 10, 2019 in U.S. Appl. No. 15/848,173.
Notice of Allowance dated Jan. 17, 2019 in U.S. Appl. No. 15/422,944.
Notice of Allowance dated Jan. 17, 2019 in U.S. Appl. No. 15/626,720.
Notice of Allowance dated Jan. 30, 2019 in U.S. Appl. No. 15/854,409.
Notice of Allowance dated Mar. 5, 2019 in U.S. Appl. No. 16/009,603.
Office Action dated Apr. 19, 2018, which issued during the prosecution of U.S. Appl. No. 15/854,438.
Office Action dated Dec. 14, 2018, which issued during the prosecution of U.S. Appl. No. 15/920,517.
Office Action dated Dec. 17, 2018, which issued during the prosecution of U.S. Appl. No. 15/920,515.
Office Action dated Dec. 17, 2018, which issued during the prosecution of U.S. Appl. No. 15/920,533.
Office Action dated Dec. 17, 2018, which issued during the prosecution of U.S. Appl. No. 15/920,538.
Office Action dated Dec. 17, 2018, which issued during the prosecution of U.S. Appl. No. 15/920,544.
Office Action dated Dec. 21, 2018, which issued during the prosecution of U.S. Appl. No. 15/900,230.
Office Action dated Feb. 25, 2016, which issued during the prosecution of U.S. Appl. No. 14/867,752.
Office Action dated Jan. 27, 2015 from the Japanese Patent Office in Japanese Application No. 2013-053543, Machine Translation; JP 2013-053543 is counterpart to U.S. Appl. No. 14/209,065.
Office Action dated Jan. 31, 2018, which issued during the prosecution of U.S. Appl. No. 14/867,752.
Office Action dated Jul. 3, 2018, which issued during the prosecution of U.S. Appl. No. 15/920,518.
Office Action dated Jul. 6, 2015, which issued during the prosecution of U.S. Appl. No. 14/209,065.
Office Action dated Jul. 6, 2018 from the United States Patent and Trademark Office in U.S. Appl. No. 15/848,173.
Office Action dated Mar. 13, 2015, which issued during the prosecution of U.S. Appl. No. 14/209,065.
Office Action dated Mar. 16, 2017, which issued during the prosecution of U.S. Appl. No. 14/867,752.
Office Action dated Mar. 24, 2016, which issued during the prosecution of U.S. Appl. No. 14/209,065.
Office Action dated May 4, 2018 which issued during the prosecution of U.S. Appl. No. 15/422,821.
Office Action dated Nov. 28, 2018, which issued during the prosecution of U.S. Appl. No. 15/899,587.
Office Action dated Nov. 28, 2018, which issued during the prosecution of U.S. Appl. No. 15/900,080.
Office Action dated Nov. 28, 2018, which issued during the prosecution of U.S. Appl. No. 15/900,144.
Office Action dated Nov. 29, 2018, which issued during the prosecution of U.S. Appl. No. 15/380,309.
Office Action dated Nov. 29, 2018, which issued during the prosecution of U.S. Appl. No. 15/422,821.
Office Action dated Nov. 8, 2016 from the Japanese Patent Office in Japanese Application No. 2014-199022, Machine Translation; JP 2014-199022 is counterpart to U.S. Appl. No. 14/867,752.
Office Action dated Oct. 15, 2018, which issued during the prosecution of U.S. Appl. No. 15/854,403.
Office Action dated Oct. 19, 2016, which issued during the prosecution of U.S. Appl. No. 14/867,752.
Office Action dated Oct. 3, 2018 from the United States Patent and Trademark Office in U.S. Appl. No. 15/280,195.
Office Action dated Oct. 5, 2017, which issued during the prosecution of U.S. Appl. No. 15/241,286.
Office Action dated Oct. 5, 2017, which issued during the prosecution of U.S. Appl. No. 15/241,297.
Office Action dated Oct. 5, 2017, which issued during the prosecution of U.S. Appl. No. 15/241,631.
Office Action dated Oct. 5, 2017, which issued during the prosecution of U.S. Appl. No. 15/378,907.
Office Action dated Sep. 10, 2015, which issued during the prosecution of U.S. Appl. No. 14/209,065.
Office Action dated Sep. 19, 2014, which issued during the prosecution of U.S. Appl. No. 14/209,065.
Office Action dated Sep. 26, 2017 issued by the Japanese Patent Office in JP Appln. No. 2014-265723, Machine Translation; corresponds to U.S. Appl. No. 14/978,834.
Office Action dated Sep. 26, 2017 issued by the Japanese Patent Office in JP Appln. No. 2015-249264, Machine Translation; corresponds to U.S. Appl. No. 14/757,555.
Office Action dated Sep. 28, 2018, which issued during the prosecution of U.S. Appl. No. 15/854,409.
Office Action dated Sep. 7, 2017, which issued during the prosecution of U.S. Appl. No. 14/867,752.
Office Action dated Dec. 19, 2018 in U.S. Appl. No. 15/900,345.
Office Action dated Dec. 19, 2018 in U.S. Appl. No. 15/900,379.
Office Action dated Dec. 20, 2018 in U.S. Appl. No. 15/900,106.
Office Action dated Dec. 20, 2018 in U.S. Appl. No. 15/900,242.
Office Action dated Dec. 21, 2018 in U.S. Appl. No. 15/900,160.
Office Action dated Dec. 21, 2018 in U.S. Appl. No. 15/920,616.
Office Action dated Dec. 25, 2018 in Japanese Application No. 2015-245144, Machine Translation; corresponds to U.S. Appl. No. 15/378,907.
Office Action dated Dec. 25, 2018 in Japanese Application No. 2015-245145, Machine Translation; corresponds to U.S. Appl. No. 15/380,336.
Office Action dated Dec. 25, 2018 in Japanese Application No. 2015-254192, Machine Translation; corresponds to U.S. Appl. No. 15/388,864.
Office Action dated Dec. 27, 2018 in U.S. Appl. No. 15/900,334.
Office Action dated Dec. 31, 2018 in U.S. Appl. No. 16/009,603.
Office Action dated Dec. 7, 2018 in U.S. Appl. No. 15/920,592.
Office Action dated Feb. 21, 2019 in U.S. Appl. No. 15/854,383.
Office Action dated Feb. 26, 2019 in Japanese Application No. 2016-123207, Machine Translation; corresponds to U.S. Appl. No. 15/619,012.
Office Action dated Feb. 26, 2019 in U.S. Appl. No. 15/380,336.
Office Action dated Feb. 26, 2019 in U.S. Appl. No. 15/624,792.
Office Action dated Feb. 26, 2019 in U.S. Appl. No. 15/624,897.
Office Action dated Feb. 26, 2019 in U.S. Appl. No. 15/626,832.
Office Action dated Feb. 5, 2019 in Japanese Application No. 2016-117339, Machine Translation; corresponds to U.S. Appl. No. 16/100,289.
Office Action dated Feb. 5, 2019 in Japanese Application No. 2016-123205, Machine Translation; corresponds to U.S. Appl. No. 15/620,916.
Office Action dated Feb. 5, 2019 in Japanese Application No. 2016-169871, Machine Translation; corresponds to U.S. Appl. No. 15/690,400.
Office Action dated Feb. 7, 2019 in U.S. Appl. No. 15/621,464.
Office Action dated Jan. 10, 2019 in U.S. Appl. No. 15/899,430.
Office Action dated Jan. 29, 2019 in U.S. Appl. No. 15/614,876.
Office Action dated Jan. 30, 2019 in U.S. Appl. No. 15/620,916.
Office Action dated Mar. 5, 2019 in U.S. Appl. No. 15/443,026.
Office Action dated Mar. 6, 2019 in U.S. Appl. No. 15/854,403.
Office Action dated Nov. 14, 2018 in U.S. Appl. No. 16/100,289.
Office Action dated Nov. 19, 2018 in U.S. Appl. No. 15/900,141.
Office Action dated Feb. 28, 2019 in U.S. Appl. No. 15/920,518.
Notice of Allowance dated Jun. 28, 2017, which issued during the prosecution of U.S. Appl. No. 15/464,991.
Notice of Allowance dated Apr. 16, 2019 in U.S. Appl. No. 15/625,428.

(56) References Cited

OTHER PUBLICATIONS

Notice of Allowance dated Apr. 30, 2019 in U.S. Appl. No. 15/380,309.
Notice of Allowance dated Mar. 13, 2019 in U.S. Appl. No. 16/100,289.
Notice of Allowance dated Mar. 18, 2019 in U.S. Appl. No. 15/626,355.
Notice of Allowance dated Mar. 18, 2019 in U.S. Appl. No. 15/628,814.
Office Action dated Apr. 15, 2019 in U.S. Appl. No. 16/182,083.
Office Action dated Apr. 16, 2019 in U.S. Appl. No. 16/232,165.
Office Action dated Apr. 23, 2019 in Japanese Application No. 2016-169851, Machine Translation; corresponds to U.S. Appl. No. 15/690,906.
Office Action dated Apr. 23, 2019 in Japanese Application No. 2016-182230, Machine Translation; corresponds to U.S. Appl. No. 15/705,531.
Office Action dated Feb. 5, 2019 in U.S. Appl. No. 16/038,339.
Office Action dated Mar. 15, 2019 in U.S. Appl. No. 15/280,195.
Office Action dated Mar. 15, 2019 in U.S. Appl. No. 15/619,012.
Office Action dated Mar. 15, 2019 in U.S. Appl. No. 15/627,696.
Office Action dated Mar. 15, 2019 in U.S. Appl. No. 15/690,906.
Office Action dated Mar. 18, 2019 in U.S. Appl. No. 15/442,961.
Office Action dated Mar. 19, 2019 in Japanese Application No. 2016-116261, Machine Translation; corresponds to U.S. Appl. No. 15/614,876.
Office Action dated Mar. 19, 2019 in Japanese Application No. 2016-124515, Machine Translation; corresponds to U.S. Appl. No. 15/621,464.
Office Action dated Mar. 19, 2019 in Japanese Application No. 2016-124529, Machine Translation; corresponds to U.S. Appl. No. 15/628,814.
Office Action dated Mar. 19, 2019 in Japanese Application No. 2016-124932, Machine Translation; corresponds to U.S. Appl. No. 15/626,720.
Office Action dated Mar. 19, 2019 in Japanese Application No. 2016-124933, Machine Translation; corresponds to U.S. Appl. No. 15/627,696.
Office Action dated Mar. 19, 2019 in Japanese Application No. 2016-124935, Machine Translation; corresponds to U.S. Appl. No. 15/626,355.
Office Action dated Mar. 19, 2019 in U.S. Appl. No. 15/443,094.
Office Action dated Mar. 21, 2019 in U.S. Appl. No. 15/900,144.
Office Action dated Mar. 21, 2019 in U.S. Appl. No. 16/160,377.
Office Action dated Mar. 27, 2019 in U.S. Appl. No. 15/690,400.
Office Action dated Mar. 7, 2019 in U.S. Appl. No. 15/854,439.
Office Action dated Apr. 4, 2019 in U.S. Appl. No. 16/184,312.
U.S. Appl. No. 15/052,115, now U.S. Pat. No. 9,704,527.
U.S. Appl. No. 15/218,190, now U.S. Pat. No. 9,721,606.
U.S. Appl. No. 15/280,195, Pending.
U.S. Appl. No. 15/422,821, Pending.
U.S. Appl. No. 15/422,944, Allowed.
U.S. Appl. No. 15/466,143, now U.S. Pat. No. 9,837,116.
U.S. Appl. No. 15/619,012, Pending.
U.S. Appl. No. 15/624,897, Pending.
U.S. Appl. No. 15/624,792, Pending.
U.S. Appl. No. 15/626,832, Pending.
U.S. Appl. No. 15/625,428, Allowed.
U.S. Appl. No. 14/978,834, now U.S. Pat. No. 9,721,605.
U.S. Appl. No. 14/757,555, now U.S. Pat. No. 9,711,174.
U.S. Appl. No. 15/197,046, now U.S. Pat. No. 9,721,607.
U.S. Appl. No. 15/380,336, Pending.
U.S. Appl. No. 15/614,876, Pending.
U.S. Appl. No. 15/620,916, Pending.
U.S. Appl. No. 15/621,464, Pending.
U.S. Appl. No. 15/626,720, Allowed.
U.S. Appl. No. 15/854,383, Pending.
U.S. Appl. No. 15/854,507, now U.S. Pat. No. 9,984,716.
U.S. Appl. No. 15/854,439, Pending.
U.S. Appl. No. 15/854,506, Patented as U.S. Appl. No. 10/008,230.
U.S. Appl. No. 15/848,173, Allowed.
U.S. Appl. No. 15/628,814, Allowed.
U.S. Appl. No. 15/690,400, Pending.
U.S. Appl. No. 15/690,906, Pending.
U.S. Appl. No. 15/626,355, Allowed.
U.S. Appl. No. 15/627,696, Pending.
U.S. Appl. No. 14/870,618, now U.S. Pat. No. 9,959,894.
U.S. Appl. No. 15/388,911, Pending.
U.S. Appl. No. 14/753,227, now U.S. Pat. No. 9,601,146.
U.S. Appl. No. 15/380,309, Allowed.
U.S. Appl. No. 15/388,864, now U.S. Pat. No. 9,773,519.
U.S. Appl. No. 15/072,550, now U.S. Pat. No. 9,704,525.
U.S. Appl. No. 15/615,871, Patented as U.S. Appl. No. 10/074,393.
U.S. Appl. No. 15/854,410, now U.S. Pat. No. 9,972,351.
U.S. Appl. No. 15/378,907, now U.S. Pat. No. 9,984,710.
U.S. Appl. No. 15/241,631, Patented as U.S. Appl. No. 10/026,435.
U.S. Appl. No. 14/209,065, now U.S. Pat. No. 9,530,444.
U.S. Appl. No. 15/854,474, now U.S. Pat. No. 9,978,414.
U.S. Appl. No. 15/854,403, Pending.
U.S. Appl. No. 15/241,297, Patented as U.S. Appl. No. 10/026,434.
U.S. Appl. No. 15/241,286, Patented as U.S. Appl. No. 10/026,433.
U.S. Appl. No. 15/464,991, now U.S. Pat. No. 9,779,772.
U.S. Appl. No. 14/867,752, Patented as U.S. Appl. No. 10/026,430.
U.S. Appl. No. 15/854,438, Allowed.
U.S. Appl. No. 15/854,409, Allowed.
U.S. Appl. No. 15/443,026, Pending.
U.S. Appl. No. 15/920,782, Patented as U.S. Appl. No. 10/134,433.
U.S. Appl. No. 15/920,563, Allowed.
U.S. Appl. No. 15/920,533, Pending.
U.S. Appl. No. 15/900,144, Pending.
U.S. Appl. No. 15/900,080, Pending.
U.S. Appl. No. 15/900,230, Pending.
U.S. Appl. No. 15/920,518, Pending.
U.S. Appl. No. 15/899,587, Pending.
U.S. Appl. No. 15/899,430, Allowed.
U.S. Appl. No. 15/920,515, Allowed.
U.S. Appl. No. 15/920,517, Allowed.
U.S. Appl. No. 15/920,538, Allowed.
U.S. Appl. No. 15/920,544, Allowed.
U.S. Appl. No. 15/920,768, Allowed.
U.S. Appl. No. 16/009,603, Allowed.
U.S. Appl. No. 16/182,083, Pending (Continuation of U.S. Appl. No. 15/920,768).
U.S. Appl. No. 15/705,531, Pending.
U.S. Appl. No. 16/232,165, Pending (Continuation of U.S. Appl. No. 15/854,438).
U.S. Appl. No. 16/100,289, Allowed.
U.S. Appl. No. 16/038,669, Pending.
U.S. Appl. No. 15/900,106, Pending.
U.S. Appl. No. 15/900,412, Patented as U.S. Appl. No. 10/062,403.
U.S. Appl. No. 15/900,141, Pending.
U.S. Appl. No. 15/900,160, Pending.
U.S. Appl. No. 15/900,345, Pending.
U.S. Appl. No. 15/900,379, Pending.
U.S. Appl. No. 16/012,018, Pending.
U.S. Appl. No. 15/920,616, Pending.
U.S. Appl. No. 15/900,242, Pending.
U.S. Appl. No. 15/900,334, Pending.
U.S. Appl. No. 15/920,592, Pending.
U.S. Appl. No. 15/920,635, Patented as U.S. Appl. No. 10/170,144.
U.S. Appl. No. 16/160,377, Pending.
U.S. Appl. No. 15/443,094, Pending.
U.S. Appl. No. 15/442,961, Pending.
U.S. Appl. No. 16/038,687, Pending.
U.S. Appl. No. 16/038,514, Pending.
U.S. Appl. No. 16/038,545, Pending.
U.S. Appl. No. 16/037,596, Pending.
U.S. Appl. No. 16/038,771, Pending.
U.S. Appl. No. 16/037,564, Pending.
U.S. Appl. No. 16/038,339, Allowed.
U.S. Appl. No. 16/037,573, Pending.
U.S. Appl. No. 16/037,681, Pending.
U.S. Appl. No. 16/038,884, Pending.

(56) References Cited

OTHER PUBLICATIONS

U.S. Appl. No. 16/038,847, Pending.
U.S. Appl. No. 16/044,574, Allowed.
U.S. Appl. No. 16/142,560, Pending.
U.S. Appl. No. 16/184,312, Pending.
U.S. Appl. No. 16/143,646, Pending.
Notice of Allowance dated Jun. 6, 2019 in U.S. Appl. No. 15/854,383.
Notice of Allowance dated May 14, 2019 in U.S. Appl. No. 15/422,821.
Notice of Allowance dated May 15, 2019 in U.S. Appl. No. 15/900,106.
Notice of Allowance dated May 15, 2019 in U.S. Appl. No. 15/900,242.
Notice of Allowance dated May 16, 2019 in U.S. Appl. No. 15/614,876.
Notice of Allowance dated May 16, 2019 in U.S. Appl. No. 15/621,464.
Notice of Allowance dated May 24, 2019 in U.S. Appl. No. 15/900,345.
Notice of Allowance dated May 24, 2019 in U.S. Appl. No. 16/143,646.
Notice of Allowance dated May 28, 2019 in U.S. Appl. No. 15/920,616.
Notice of Allowance dated May 29, 2019 in U.S. Appl. No. 15/900,160.
Notice of Allowance dated May 29, 2019 in U.S. Appl. No. 15/900,334.
Notice of Allowance dated May 30, 2019 in U.S. Appl. No. 15/900,230.
Office Action dated Jun. 10, 2019 in U.S. Appl. No. 15/920,518.
Office Action dated Jun. 6, 2019 in U.S. Appl. No. 15/899,587.
Office Action dated May 23, 2019 in U.S. Appl. No. 15/388,911.
Notice of Allowance dated May 13, 2019 in U.S. Appl. No. 15/900,379.
Notice of Allowance dated Jun. 25, 2019 in U.S. Appl. No. 15/620,916.
Office Action dated Jun. 25, 2019 in Japanese Application No. 2015-245144, Machine Translation corresponds to U.S. Appl. No. 15/378,907.
Notice of Allowance dated Jun. 27, 2019 in U.S. Appl. No. 15/854,439.

* cited by examiner

MAGNETIC TAPE HAVING CHARACTERIZED BACK COATING LAYER

CROSS-REFERENCE TO RELATED APPLICATIONS

This application claims priority under 35 U.S.C 119 to Japanese Patent Application No. 2017-029501 filed on Feb. 20, 2017. The above application is hereby expressly incorporated by reference, in its entirety, into the present application.

BACKGROUND OF THE INVENTION

1. Field of the Invention

The present invention relates to a magnetic tape.

2. Description of the Related Art

Magnetic recording media are divided into tape-shaped magnetic recording media and disk-shaped magnetic recording media, and tape-shaped magnetic recording media, that is, magnetic tapes are mainly used for storage such as data back-up.

As the magnetic tapes, JP1988-249932A (JP-S63-249932A) and JP1989-60819A (JP-H01-60819A) disclose a magnetic tape including a back coating layer (described as a "back layer" in JP1988-249932A (JP-S63-249932A) and JP1989-60819A (JP-H01-60819A)) on a surface side of a non-magnetic support opposite to a surface side provided with a magnetic layer.

SUMMARY OF THE INVENTION

The magnetic tape is normally accommodated in a magnetic tape cartridge in a state of being wound around a reel. In order to increase recording capacity for 1 reel of the magnetic tape cartridge, it is necessary to increase total length of the magnetic tape accommodated in 1 reel of the magnetic tape cartridge. In order to increase the recording capacity, it is necessary that the magnetic tape is thinned (hereinafter, referred to as "thinning").

As a method of thinning the magnetic tape, a method of decreasing a thickness of a back coating layer is used. Regarding the thickness of the back coating layer, JP1988-249932A (JP-S63-249932A) discloses that the thickness of the back coating layer is equal to or smaller than 2.5 μm (Claim 1 of JP1988-249932A (JP-S63-249932A)) and the thickness of the back coating layer of the examples of JP1988-249932A (JP-S63-249932A) is 2.0 μm. In addition, JP1989-60819A (JP-H01-60819A) discloses that the thickness of the back coating layer is 1.5 μm (Claim 1 of JP1989-60819A (JP-H01-60819A)) and the thickness of the back coating layer of the examples of JP1989-60819A (JP-H01-60819A) is 1.0 μm. However, in order to realize even higher recording capacity which is demanded in recent years, it is desired that the back coating layer is even more thinned (hereinafter, referred to as "thinning").

However, in a case where the inventors have studied regarding the thinning of the back coating layer, it was clear that, particularly, in a magnetic tape in which a back coating layer is thinned to have a thickness equal to or smaller than 0.30 μm, a phenomenon in which an edge portion of the magnetic tape is damaged (hereinafter, referred to as "edge damage") significantly occurs, after causing the magnetic tape to run in a drive. In regards to this point, more specifically, the recording and/or reproducing of information on the magnetic tape is performed by setting a magnetic tape cartridge in a drive and causing the magnetic tape to run in the magnetic tape cartridge. As described above, since the magnetic tape is accommodated in the magnetic tape cartridge in a state of being wound around the reel, sending of the magnetic tape from the reel and winding thereof are performed during the running. In a case where disordered winding occurs at the time of this winding, an edge of the magnetic tape hits against a flange or the like of a reel and the edge damage may occur. This edge damage may cause an increase in the number of errors at the time of recording and/or a deterioration of running stability. Accordingly, it is necessary that the disordered winding is prevented to reduce the edge damage.

Therefore, an object of the invention is to provide a magnetic tape which includes a back coating layer thinned to have a thickness equal to or smaller than 0.30 μm and in which occurrence of edge damage is prevented.

According to one aspect of the invention, there is provided a magnetic tape comprising: a non-magnetic support; a magnetic layer including ferromagnetic powder and a binding agent on one surface side of the non-magnetic support; and a back coating layer including non-magnetic powder and a binding agent on the other surface side of the non-magnetic support, in which a thickness of the back coating layer is equal to or smaller than 0.30 μm, the back coating layer includes fatty acid ester, a logarithmic decrement acquired by a pendulum viscoelasticity test performed regarding the surface of the back coating layer is equal to or smaller than 0.060, a full width at half maximum of spacing distribution measured by optical interferometry regarding the surface of the back coating layer before performing a vacuum heating with respect to the magnetic tape is greater than 0 nm and equal to or smaller than 10.0 nm, a full width at half maximum of spacing distribution measured by optical interferometry regarding the surface of the back coating layer after performing the vacuum heating with respect to the magnetic tape is greater than 0 nm and equal to or smaller than 10.0 nm, and a difference ($S_{after}-S_{before}$) between a spacing $S_{after}$ measured by optical interferometry regarding the surface of the back coating layer after performing the vacuum heating with respect to the magnetic tape and a spacing $S_{before}$ measured by optical interferometry regarding the surface of the back coating layer before performing the vacuum heating with respect to the magnetic tape is greater than 0 nm and equal to or smaller than 8.0 nm.

Hereinafter, the logarithmic decrement acquired by a pendulum viscoelasticity test performed regarding the surface of the back coating layer is also simply referred to as "logarithmic decrement". In addition, the "surface of the back coating layer" of the magnetic tape is identical to the surface of the magnetic tape on the back coating layer side. The "surface of the magnetic layer" of the magnetic tape is identical to the surface of the magnetic tape on the magnetic layer side.

In the invention and the specification, the logarithmic decrement acquired by a pendulum viscoelasticity test performed regarding the surface of the back coating layer is a value obtained by the following method.

FIGS. 1 to 3 are explanatory diagrams of a measurement method of the logarithmic decrement. Hereinafter, the measurement method of the logarithmic decrement will be described with reference to the drawings. However, the aspect shown in the drawing is merely an example and the invention is not limited thereto.

A measurement sample 100 is cut out from the magnetic tape which is a measurement target. The cut-out measurement sample 100 is placed on a substrate 103 so that a measurement surface (surface of the back coating layer) faces upwards, in a sample stage 101 in a pendulum viscoelasticity tester, and the measurement sample is fixed by fixing tapes 105 in a state where obvious wrinkles which can be visually confirmed are not generated.

A pendulum-attached columnar cylinder edge 104 (diameter of 4 mm) having mass of 13 g is loaded on the measurement surface of the measurement sample 100 so that a long axis direction of the cylinder edge becomes parallel to a longitudinal direction of the measurement sample 100. An example of a state in which the pendulum-attached columnar cylinder edge 104 is loaded on the measurement surface of the measurement sample 100 as described above (state seen from the top) is shown in FIG. 1. In the aspect shown in FIG. 1, a holder and temperature sensor 102 is installed and a temperature of the surface of the substrate 103 can be monitored. However, this configuration is not essential. In the aspect shown in FIG. 1, the longitudinal direction of the measurement sample 100 is a direction shown with an arrow in the drawing, and is a longitudinal direction of a magnetic tape from which the measurement sample is cut out. The description regarding "parallel" and the like disclosed in the specification includes a range of errors allowed in the technical field of the invention. For example, the range of errors means a range of less than ±10° from an exact angle, and the error from the exact angle is preferably equal to or smaller than 5° and more preferably equal to or smaller than 3. In addition, as a pendulum 107 (see FIG. 2), a pendulum formed of a material having properties of being adsorbed to a magnet formed of metal or an alloy is used.

The temperature of the surface of the substrate 103 on which the measurement sample 100 is placed is set to 80° C. by increasing the temperature at a rate of temperature increase equal to or lower than 5° C./min (arbitrary rate of temperature increase may be set, as long as it is equal to or lower than 5° C./min), and the pendulum movement is started (induce initial vibration) by releasing adsorption between the pendulum 107 and a magnet 106. An example of a state of the pendulum 107 which performs the pendulum movement (state seen from the side) is shown in FIG. 2. In the aspect shown in FIG. 2, in the pendulum viscoelasticity tester, the pendulum movement is started by stopping (switching off) the electricity to the magnet (electromagnet) 106 disposed on the lower side of the sample stage to release the adsorption, and the pendulum movement is stopped by restarting (switching on) the electricity to the electromagnet to cause the pendulum 107 to be adsorbed to the magnet 106. As shown in FIG. 2, during the pendulum movement, the pendulum 107 reciprocates the amplitude. From a result obtained by monitoring displacement of the pendulum with a displacement sensor 108 while the pendulum reciprocates the amplitude, a displacement-time curve in which a vertical axis indicates the displacement and a horizontal axis indicates the elapsed time is obtained. An example of the displacement-time curve is shown in FIG. 3. FIG. 3 schematically shows correspondence between the state of the pendulum 107 and the displacement-time curve. The stop (adsorption) and the pendulum movement are repeated at a regular measurement interval, the logarithmic decrement Δ (no unit) is acquired from the following Expression by using a displacement-time curve obtained in the measurement interval after 10 minutes or longer (may be arbitrary time, as long as it is 10 minutes or longer) has elapsed, and this value is set as logarithmic decrement of the surface of the back coating layer of the magnetic tape. The adsorption time of the first adsorption is set as 1 second or longer (may be arbitrary time, as long as it is 1 second or longer), and the interval between the adsorption stop and the adsorption start is set as 6 seconds or longer (may be arbitrary time, as long as it is 6 seconds or longer). The measurement interval is an interval of the time from the adsorption start and the next adsorption start. In addition, humidity of an environment in which the pendulum movement is performed, may be arbitrary relative humidity, as long as the relative humidity is 40% to 70%.

$$\Delta = \frac{\ln\left(\frac{A_1}{A_2}\right) + \ln\left(\frac{A_2}{A_3}\right) + \ldots \ln\left(\frac{A_n}{A_{n+1}}\right)}{n}$$

In the displacement-time curve, an interval between a point of the minimum displacement and a point of the next minimum displacement is set as a period of a wave. n indicates the number of waves included in the displacement-time curve in the measurement interval, and An indicates the minimum displacement and maximum displacement of the n-th wave. In FIG. 3, an interval between the minimum displacement of the n-th wave and the next minimum displacement is shown as Pn (for example, $P_1$ regarding the first wave, $P_2$ regarding the second wave, and $P_3$ regarding the third wave). In the calculation of the logarithmic decrement, a difference (in Expression $A_{n+1}$, in the displacement-time curve shown in FIG. 3, $A_4$) between the minimum displacement and the maximum displacement appearing after the n-th wave is also used. However, a part where the pendulum 107 stops (adsorption) after the maximum displacement is not used in the counting of the number of waves. In addition, a part where the pendulum 107 stops (adsorption) before the maximum displacement is not used in the counting of the number of waves, either. Accordingly, the number of waves is 3 (n=3) in the displacement-time curve shown in FIG. 3.

Hereinafter, the full width at half maximum (FWHM) of spacing distribution measured by optical interferometry regarding the surface of the back coating layer before performing a vacuum heating with respect to the magnetic tape is also referred to as "$FWHM_{before}$" and the full width at half maximum of spacing distribution measured by optical interferometry regarding the surface of the back coating layer after performing a vacuum heating with respect to the magnetic tape is also referred to as "$FWHM_{after}$". The difference between a spacing $S_{after}$ measured by optical interferometry regarding the surface of the back coating layer after performing the vacuum heating with respect to the magnetic tape and a spacing $S_{before}$ measured by optical interferometry regarding the surface of the back coating layer before performing the vacuum heating with respect to the magnetic tape is also referred to as a "difference ($S_{after}-S_{before}$)". The $FWHM_{after}$ and the spacing $S_{after}$ for acquiring the difference ($S_{after}-S_{before}$) are values acquired after performing the vacuum heating with respect to the magnetic tape. In the invention and the specification, the "vacuum heating" of the magnetic tape is performed by holding the magnetic tape in an environment of a pressure of 200 Pa to 0.01 MPa and at an atmosphere temperature of 70° C. to 90° C. for 24 hours.

In the invention and the specification, the spacing measured by optical interferometry regarding the surface of the back coating layer of the magnetic tape is a value measured by the following method.

In a state where the magnetic tape and a transparent plate-shaped member (for example, glass plate or the like) are overlapped with each other so that the surface of the back coating layer of the magnetic tape faces the transparent plate-shaped member, a pressing member is pressed against the side of the magnetic tape opposite to the back coating layer side at a pressure of $5.05 \times 10^4$ N/m (0.5 atm). In this state, the surface of the back coating layer of the magnetic tape is irradiated with light through the transparent plate-shaped member (irradiation region: 150,000 to 200,000 $\mu m^2$), and a spacing (distance) between the surface of the back coating layer of the magnetic tape and the surface of the transparent plate-shaped member is acquired based on intensity (for example, contrast of interference fringe image) of interference light generated due to a difference in a light path between reflected light from the surface of the back coating layer of the magnetic tape and reflected light from the surface of the transparent plate-shaped member on the magnetic tape side. The light emitted here is not particularly limited. In a case where the emitted light is light having an emission wavelength over a comparatively wide wavelength range as white light including light having a plurality of wavelengths, a member having a function of selectively cutting light having a specific wavelength or a wavelength other than wavelengths in a specific wavelength range, such as an interference filter, is disposed between the transparent plate-shaped member and a light reception unit which receives reflected light, and light at some wavelengths or in some wavelength ranges of the reflected light is selectively incident to the light reception unit. In a case where the light emitted is light (so-called monochromatic light) having a single luminescence peak, the member described above may not be used. The wavelength of light incident to the light reception unit can be set to be 500 to 700 nm, for example. However, the wavelength of light incident to the light reception unit is not limited to be in the range described above. In addition, the transparent plate-shaped member may be a member having transparency through which emitted light passes, to the extent that the magnetic tape is irradiated with light through this member and interference light is obtained.

The measurement described above can be performed by using a commercially available tape spacing analyzer (TSA) such as Tape Spacing Analyzer manufactured by Micro Physics, Inc., for example. The spacing measurement of the examples was performed by using Tape Spacing Analyzer manufactured by Micro Physics, Inc.

In addition, the full width at half maximum of spacing distribution of the invention and the specification is a full width at half maximum (FWHM), in a case where the interference fringe image obtained by the measurement of the spacing described above is divided into 300,000 points, a spacing of each point (distance between the surface of the back coating layer of the magnetic tape and the surface of the transparent plate-shaped member on the magnetic tape side) is acquired, this spacing is shown with a histogram, and this histogram is fit with Gaussian distribution.

Further, the difference ($S_{after} - S_{before}$) is a value obtained by subtracting a mode before the vacuum heating from a mode after the vacuum heating of the 300,000 points.

In one aspect, the logarithmic decrement is 0.010 to 0.060.

In one aspect, the thickness of the back coating layer is 0.10 μm to 0.30 μm.

In one aspect, the $FWHM_{before}$ is greater than 0 nm and equal to or smaller than 8.0 nm.

In one aspect, the $FWHM_{after}$ is greater than 0 nm and equal to or smaller than 8.0 nm.

In one aspect, the difference ($S_{after} - S_{before}$) is greater than 0 nm and equal to or smaller than 6.0 nm.

In one aspect, the non-magnetic powder included in the back coating layer is one or more kinds of non-magnetic powder selected from the group consisting of inorganic powder and carbon black.

In one aspect, the content of the inorganic powder in the back coating layer is greater than 50.0 parts by mass and equal to or smaller than 100.0 parts by mass with respect to 100.0 parts by mass of the total amount of the non-magnetic powder included in the back coating layer.

In one aspect, the magnetic tape further comprises a non-magnetic layer including non-magnetic powder and a binding agent between the non-magnetic support and the magnetic layer.

According to one aspect of the invention, it is possible to provide a magnetic tape including a back coating layer having a thickness equal to or smaller than 0.30 μm and in which occurrence of the edge damage is prevented.

DESCRIPTION OF THE PREFERRED EMBODIMENTS

Figure 1:
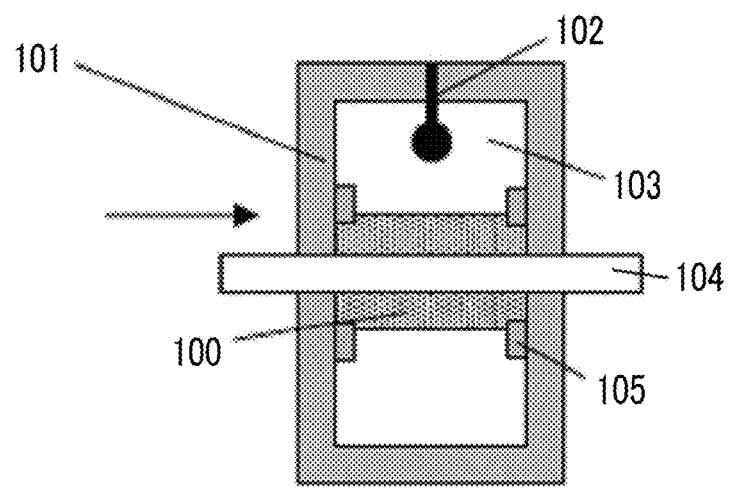
FIG. 1 is an explanatory diagram of a measurement method of a logarithmic decrement.
Figure 2:
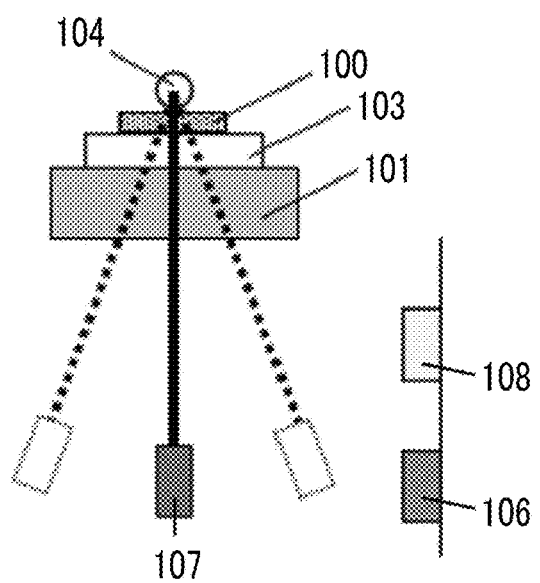
FIG. 2 is an explanatory diagram of the measurement method of a logarithmic decrement.
Figure 3:
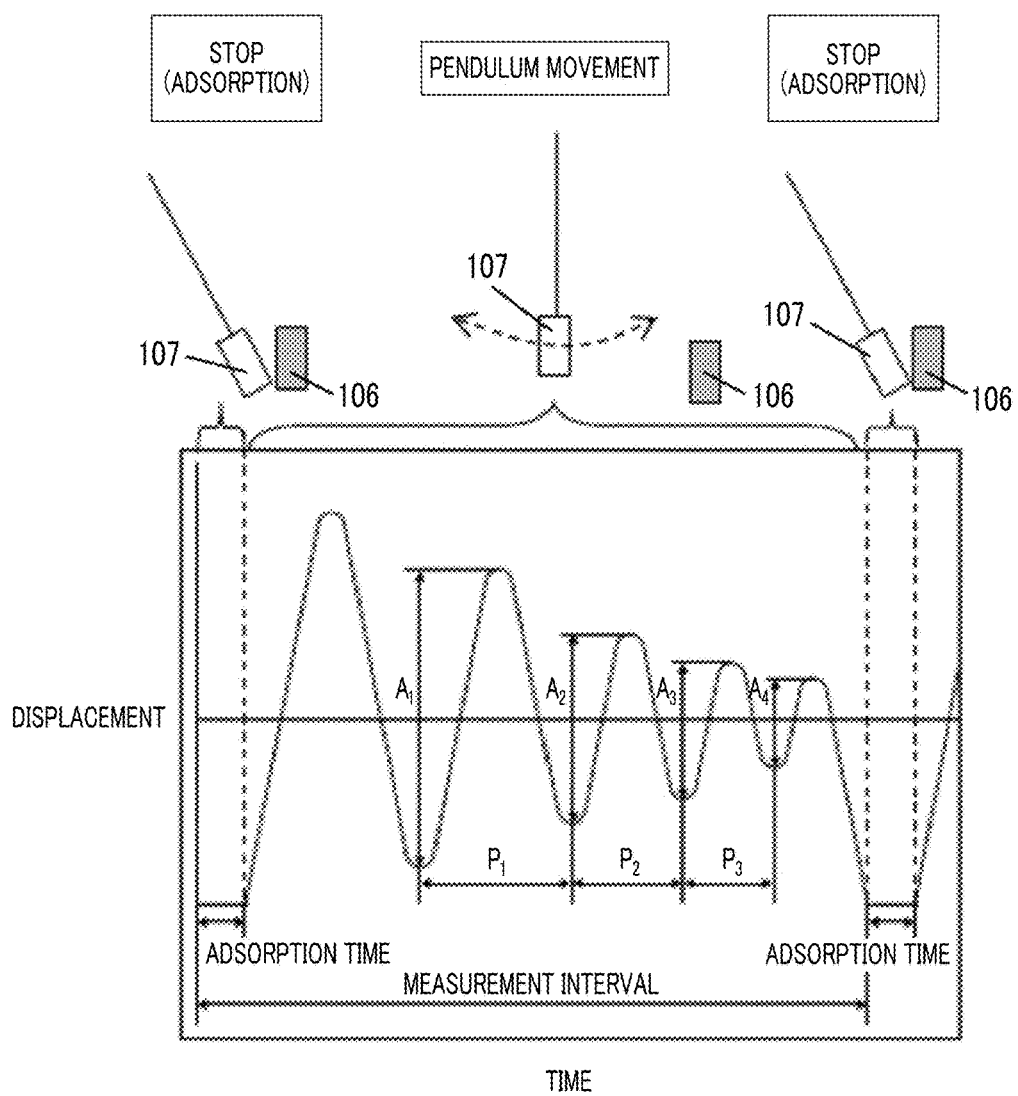
FIG. 3 is an explanatory diagram of the measurement method of a logarithmic decrement.

One aspect of the invention relates to a magnetic tape including: a non-magnetic support; a magnetic layer including ferromagnetic powder and a binding agent on one surface side of the non-magnetic support; and a back coating layer including non-magnetic powder and a binding agent on the other surface side of the non-magnetic support, in which a thickness of the back coating layer is equal to or smaller than 0.30 μm, the back coating layer includes fatty acid ester, a logarithmic decrement acquired by a pendulum viscoelasticity test performed regarding the surface of the back coating layer is equal to or smaller than 0.060, a full width at half maximum of spacing distribution measured by optical interferometry regarding the surface of the back coating layer before performing a vacuum heating with respect to the magnetic tape ($FWHM_{before}$) is greater than 0 nm and equal to or smaller than 10.0 nm, a full width at half maximum of spacing distribution measured by optical interferometry regarding the surface of the back coating layer after performing the vacuum heating with respect to the magnetic tape ($FWHM_{after}$) is greater than 0 nm and equal to or smaller than 10.0 nm, and a difference ($S_{after} - S_{before}$) between a spacing $S_{after}$ measured by optical interferometry regarding the surface of the back coating layer after performing the vacuum heating with respect to the magnetic tape and a spacing $S_{before}$ measured by optical interferometry regarding the surface of the back coating layer before performing the vacuum heating with respect to the magnetic tape is greater than 0 nm and equal to or smaller than 8.0 nm.

In the magnetic tape, even in a case where the back coating layer is thinned to have a thickness equal to or smaller than 0.30 μm, occurrence of edge damage can be prevented. In regards to this point, the inventors have considered as follows.

The inventors have considered that a reason for which the edge damage significantly occurs, in a case where the back coating layer is thinned to have a thickness equal to or smaller than 0.30 m, is because a contact failure between the surface of the magnetic layer and the surface of the back coating layer occurs at the time of the winding, due to a deterioration of rigidity of the back coating layer, and thus disordered winding occurs. With respect to this, the inventors have considered that, in the magnetic tape, by setting the logarithmic decrement measured regarding the surface of the back coating layer, the difference ($S_{after}-S_{before}$), the $FWHM_{before}$, and the $FWHM_{after}$, to be in the ranges described above, it is possible to increase stability of a contact state of the surface of the back coating layer and the surface of the magnetic layer at the time of winding, and as a result, occurrence of edge damage occurred due to the disordered winding can be prevented. Specific description is as the following (1) to (3).

(1) The inventors have thought that an increase in uniformity of adhesiveness between the surface of the magnetic layer and the surface of the back coating layer in each portion on the surface at the time of the winding, contributes to an increase in stability of the contact state between the surface of the back coating layer and the surface of the magnetic layer at the time of the winding. It is assumed that pressure sensitive adhesive components separated from the surface of the back coating layer affects the uniformity of the adhesiveness. Specifically, it is assumed that uniformity the adhesiveness between the surface of the magnetic layer and the surface of the back coating layer in each portion on the surface at the time of the winding decreases, as the amount of the pressure sensitive adhesive components increases, and the uniformity of the adhesiveness increases, as the amount of the pressure sensitive adhesive components decreases.

In regards to this point described above, the inventors have considered that the logarithmic decrement measured by the method described above is a value which may be an index of the amount of the pressure sensitive adhesive components separated from the surface of the back coating layer. Specifically, it is thought that, the value of the logarithmic decrement increases, as the amount of the pressure sensitive adhesive components increases, and the value of the logarithmic decrement decreases, as the amount of the pressure sensitive adhesive components decreases. The inventors have considered that, in the magnetic tape, by setting the logarithmic decrement measured regarding the surface of the back coating layer to be equal to or smaller than 0.060, the uniformity of the adhesiveness between the surface of the magnetic layer and the surface of the back coating layer in each portion on the surface at the time of the winding can be prevented.

The details of the pressure sensitive adhesive components are not clear. The inventors have surmised that the pressure sensitive adhesive components may be derived from a resin used as a binding agent. The specific description is as follows.

As a binding agent, various resins can be used as will be described later in detail. The resin is a polymer (including a homopolymer or a copolymer) of two or more polymerizable compounds and generally also includes a component having a molecular weight which is smaller than an average molecular weight (hereinafter, referred to as a "binding agent component having a low molecular weight"). The inventors have considered that, as a large amount of the binding agent component having a low molecular weight is separated from the surface of the back coating layer, the uniformity of the adhesiveness between the surface of the magnetic layer and the surface of the back coating layer in each portion on the surface at the time of the winding decreases. The inventors have surmised that the binding agent component having a low molecular weight have pressure sensitive adhesive properties and the logarithmic decrement acquired by the method described above may be an index for the amount of the pressure sensitive adhesive components separated from the surface of the back coating layer. In one aspect, the back coating layer is formed by applying a back coating layer forming composition including a curing agent in addition to non-magnetic powder and a binding agent onto a surface of a non-magnetic support and performing a curing process. With the curing process here, it is possible to allow a curing reaction (crosslinking reaction) between the binding agent and the curing agent. However, the inventors have considered that the binding agent component having a low molecular weight may have poor reactivity regarding the curing reaction. The reason thereof is not clear. The inventors have surmised that, since the reactivity regarding the curing reaction is poor, the binding agent component having a low molecular weight which hardly remains in the back coating layer may be one of reasons for that the binding agent component having a low molecular weight is separated from the surface of the back coating layer.

(2) Regarding the difference ($S_{after}-S_{before}$), the inventors have thought that this value can be an index of a thickness of a liquid film formed on the surface of the back coating layer with fatty acid ester included in the back coating layer. Specific description is as follows.

A lubricant is generally divided broadly into a fluid lubricant and a boundary lubricant and fatty acid ester is known as a component which can function as a fluid lubricant. The inventors have thought that fatty acid ester can protect the back coating layer by forming a liquid film on the surface of the back coating layer. In addition, it is thought that, in a case where the magnetic tape is wound around a reel and the surface of the back coating layer and the surface of the magnetic layer comes into contact with each other, a liquid film of fatty acid ester can cause a force (meniscus force) of pulling both surface between both surfaces by a meniscus (liquid crosslinking). It is assumed that this contributes to an increase in stability of the contact state. However, it is thought, in a case where an excessive amount of fatty acid ester is present on the surface of the back coating layer, a meniscus force is strongly applied and causes sticking due to a decrease in stability of the contact state.

In regards to the point described above, the inventors have thought that, since fatty acid ester is a component having properties volatilized by vacuum heating, the difference ($S_{after}-S_{before}$) of a spacing between a state after the vacuum heating (state in which a liquid film of fatty acid ester is volatilized and removed) and a state before the vacuum heating (state in which the liquid film of fatty acid ester is present) may be an index for the thickness of the liquid film formed of fatty acid ester on the surface of the back coating layer. The inventors have surmised that the presence of the liquid film of fatty acid ester on the surface of the back coating layer so that the difference ($S_{after}-S_{before}$) greater than 0 nm and equal to or smaller than 8.0 nm, causes the surface of the back coating layer and the surface of the magnetic layer to come into contact in a stable contact state while preventing sticking therebetween at the time of the winding.

(3) The inventors have thought that, on the surface of the back coating layer in which the difference ($S_{after}-S_{before}$) is the range described above, the $FWHM_{before}$ and the $FWHM_{after}$ which is in the ranges described above contributes to a meniscus force promoting prevention of the disordered winding, applied between the surface of the back coating layer and the surface of the magnetic layer. In regards to this point, a smaller value of the full width at half maximum of spacing distribution measured by optical interferometry means that a variation in the values of the spacing measured on each part of the surface of the measurement target is small. It is considered that the reason for the variation in values of the spacing in the surface of the back coating layer of the magnetic tape is a variation in shapes of the surface of the back coating layer (for example, a variation due to a dispersed state of the non-magnetic powder included in the back coating layer) and a variation in the thickness of the liquid film formed of fatty acid ester. It is thought that the $FWHM_{before}$ measured before the vacuum heating, that is, in a state where the liquid film of fatty acid ester is present on the surface of the back coating layer becomes great, as the variation in shapes of the surface of the back coating layer and the variation in thickness of the liquid film of fatty acid ester are great, and particularly, the $FWHM_{before}$ is greatly affected by the variation in the thickness of the liquid film of fatty acid ester. In contrast, the inventors have surmised that the $FWHM_{after}$ measured after the vacuum heating, that is, in a state where the liquid film of fatty acid ester is removed from the surface of the back coating layer becomes great, as the variation in shapes of the surface of the back coating layer is great. That is, the inventors have considered that the small $FWHM_{before}$ and $FWHM_{after}$ mean a small variation in shapes of the surface of the back coating layer and a small variation in the thickness of the liquid film of fatty acid ester on the surface of the back coating layer. The inventors have surmised that an increase in uniformity of the shapes of the surface of the back coating layer and an increase in uniformity of the thickness of the liquid film of fatty acid ester so that the $FWHM_{before}$ and $FWHM_{after}$ are greater than 0 nm and equal to or smaller than 10.0 nm, contributes to a meniscus force promoting prevention of the disordered winding, applied between the surface of the back coating layer and the surface of the magnetic layer in which the difference ($S_{after}-S_{before}$) is the range described above.

The description described above is the surmise of the inventors regarding a reason for which occurrence of edge damage is can be prevented in the magnetic tape, regardless of the back coating layer thinned to have a thickness of 0.30 μm. However, the above-mentioned description is a merely surmise and the invention is not limited thereto.

Hereinafter, the magnetic tape will be described more specifically.

Back Coating Layer

Thickness of Back Coating Layer

The thickness of the back coating layer of the magnetic tape is equal to or smaller than 0.30 μm. The thickness of the back coating layer can be, for example, 0.10 to 0.30 μm, can be 0.15 to 0.30 μm, or can be 0.20 to 0.30 μm. The thinning of the back coating layer to have a thickness equal to or smaller than 0.30 μm contributes to the thinning of the magnetic tape including this back coating layer. However, the thinning of the back coating layer causes occurrence of the edge damage. With respect to this, in a case where the logarithmic decrement, the difference ($S_{after}-S_{before}$), the $FWHM_{before}$, and the $FWHM_{after}$ measured regarding the surface of the back coating layer having a thickness of equal to or smaller than 0.30 μm are respectively in the ranges described above, it is possible to prevent the occurrence of the edge damage. From a viewpoint of further thinning the magnetic tape, the thickness of the back coating layer can also be equal to or smaller than 0.25 μm and equal to or smaller than 0.20 μm.

Logarithmic Decrement

The logarithmic decrement acquired by a pendulum viscoelasticity test performed regarding the surface of the back coating layer of the magnetic tape is equal to or smaller than 0.060. The inventors have surmised that this point contributes to the prevention of the occurrence of the edge damage in the magnetic tape including the back coating layer having a thickness equal to or smaller than 0.30 μm. From a viewpoint of further preventing the edge damage, the logarithmic decrement is preferably equal to or smaller than 0.058, more preferably equal to or smaller than 0.055, even more preferably equal to or smaller than 0.050, still preferably equal to or smaller than 0.045, still more preferably equal to or smaller than 0.040, and still even more preferably equal to or smaller than 0.035. The logarithmic decrement can be, for example, equal to or greater than 0.010 or equal to or greater than 0.012. From a viewpoint of further preventing the edge damage preventing occurrence of the edge damage, low logarithmic decrement tends to be preferable. Accordingly, the logarithmic decrement may be lower than the lower limit exemplified described above. A specific aspect of a method for adjusting the logarithmic decrement of the back coating layer will be described later.

$FWHM_{before}$ and $FWHM_{after}$

Both of the $FWHM_{before}$ measured before the vacuum heating and the $FWHM_{after}$ measured after the vacuum heating regarding the surface of the back coating layer of the magnetic tape are greater than 0 nm and equal to or smaller than 10.0 nm. As described above, the inventors have surmised that the $FWHM_{before}$ and $FWHM_{after}$ in the ranges described above contribute to an increase in stability of the contact state of the surface of the back coating layer and the surface of the magnetic layer at the time of winding. From a viewpoint of further increasing stability of the contact state, the $FWHM_{before}$ and $FWHM_{after}$ are preferably equal to or smaller than 9.0 nm, more preferably equal to or smaller than 8.0 nm, even more preferably equal to or smaller than 7.0 nm, still preferably equal to or smaller than 6.0 nm, and still more preferably equal to or smaller than 5.0 nm. The $FWHM_{before}$ and $FWHM_{after}$ can be, for example, equal to or greater than 1.0 nm or equal to or greater than 2.0 nm. From a viewpoint of preventing the occurrence of edge damage, small $FWHM_{before}$ and $FWHM_{after}$ tend to be preferable. Accordingly, the $FWHM_{before}$ and $FWHM_{after}$ may be lower than the lower limits exemplified above.

The $FWHM_{before}$ measured before the vacuum heating can be decreased mainly by decreasing the variation in the thickness of the liquid film of fatty acid ester. An example of a specific method will be described later. Meanwhile, the $FWHM_{after}$ measured after the vacuum heating can be decreased by decreasing the variation in shapes of the surface of the back coating layer. In order to realize the decrease described above, it is preferable to improve dispersibility of the non-magnetic powder in the back coating layer forming composition. The dispersibility can be adjusted by, for example, the kind of non-magnetic powder used in the formation of the back coating layer, and in a case of including two or more kinds of non-magnetic powders, the dispersibility can be adjusted by a mixing ratio thereof. An example of a specific method will be described later.

Difference ($S_{after}-S_{before}$)

The difference ($S_{after}-S_{before}$) of the spacings before and after the vacuum heating measured regarding the surface of the back coating layer of the magnetic tape is greater than 0 nm and equal to or smaller than 8.0 nm. From a viewpoint of further preventing the occurrence of the edge damage, the difference ($S_{after}-S_{before}$) is preferably equal to or greater than 0.1 nm, more preferably equal to or greater than 1.0 nm, and even more preferably equal to or greater than 1.5 nm. In addition, from the same viewpoint, the difference ($S_{after}-S_{before}$) is preferably equal to or smaller than 7.0 nm, more preferably equal to or smaller than 6.0 nm, even more preferably equal to or smaller than 5.0 nm, and still more preferably equal to or smaller than 4.0 nm. The difference ($S_{after}-S_{before}$) can be controlled by the amount of fatty acid ester added to a back coating layer forming composition. As the amount of fatty acid ester added to a back coating layer forming composition increases, the difference ($S_{after}-S_{before}$) tends to be increased.

Fatty Acid Ester

The magnetic tape includes fatty acid ester in the back coating layer. The surmise of the inventors regarding the fatty acid ester and the difference ($S_{after}-S_{before}$), the FWHM$_{before}$, and the FWHM$_{after}$ is as described above.

The fatty acid ester may be included alone as one type or two or more types thereof may be included in the back coating layer. Examples of fatty acid ester include esters of lauric acid, myristic acid, palmitic acid, stearic acid, oleic acid, linoleic acid, linolenic acid, behenic acid, erucic acid, and elaidic acid. Specific examples thereof include butyl myristate, butyl palmitate, butyl stearate (butyl stearate), neopentyl glycol dioleate, sorbitan monostearate, sorbitan distearate, sorbitan tristearate, oleyl oleate, isocetyl stearate, isotridecyl stearate, octyl stearate, isooctyl stearate, amyl stearate, and butoxyethyl stearate.

The content of fatty acid ester in the back coating layer is, for example, 0.1 to 10.0 parts by mass and is preferably 1.0 to 5.0 parts by mass with respect to 100.0 parts by mass of the non-magnetic powder included in the back coating layer. In a case of using two or more kinds of different fatty acid esters as the fatty acid ester, the content thereof is the total content thereof. In the invention and the specification, a given component may be used alone or used in combination of two or more kinds thereof, unless otherwise noted. In a case of using two or more kinds of the given component, the content of the component is a total content of the two or more kinds thereof, unless otherwise noted.

Other Lubricants

The magnetic tape includes fatty acid ester which is one kind of lubricants in the back coating layer and may or may not include a lubricant other than the fatty acid ester in the back coating layer. As the lubricant other than the fatty acid ester, fatty acid or fatty acid amide can be used. Fatty acid and fatty acid amide are known as components which can function as a boundary lubricant.

Examples of fatty acid include lauric acid, myristic acid, palmitic acid, stearic acid, oleic acid, linoleic acid, linolenic acid, behenic acid, erucic acid, and elaidic acid, and stearic acid, myristic acid, and palmitic acid are preferable, and stearic acid is more preferable. Fatty acid may be included in the back coating layer in a state of salt such as metal salt.

As fatty acid amide, amide of various fatty acid described above is used, and examples thereof include lauric acid amide, myristic acid amide, palmitic acid amide, and stearic acid amide.

In a case of using fatty acid and a derivative of fatty acid (ester and amide) in combination, a part derived from fatty acid of the fatty acid derivative preferably has a structure which is the same as or similar to that of fatty acid used in combination. As an example, in a case of using stearic acid as fatty acid, it is preferable to use stearic acid ester and/or stearic acid amide.

The content of fatty acid in the back coating layer is, for example, 0 to 10.0 parts by mass, preferably 0.1 to 10.0 parts by mass, and more preferably 1.0 to 7.0 parts by mass, with respect to 100.0 parts by mass of the non-magnetic powder included in the back coating layer. The content of fatty acid amide in the back coating layer is, for example, 0 to 3.0 parts by mass, preferably 0 to 2.0 parts by mass, and more preferably 0 to 1.0 part by mass with respect to 100.0 parts by mass of the non-magnetic powder included in the back coating layer.

The various lubricants described above may be included in the magnetic layer and/or the non-magnetic layer which is arbitrarily provided. Regarding the kind and/or the content of the lubricants in each layer, a well-known technology regarding each layer can be used.

Non-Magnetic Powder

As the non-magnetic powder included in the back coating layer, any one or both of carbon black and non-magnetic powder other than carbon black can be used. As the non-magnetic powder other than carbon black, inorganic powder can be used. Examples of the inorganic powder include inorganic powder of iron oxide such as α-iron oxide, titanium oxide such as titanium dioxide, cerium oxide, tin oxide, tungsten oxide, ZnO, $ZrO_2$, $SiO_2$, $Cr_2O_3$, α-alumina, β-alumina, γ-alumina, goethite, corundum, silicon nitride, titanium carbide, magnesium oxide, boron nitride, molybdenum disulfide, copper oxide, $MgCO_3$, $CaCO_3$, $BaCO_3$, $SrCO_3$, $BaSO_4$, and silicon carbide. The preferred inorganic powder is inorganic oxide powder, α-iron oxide and titanium oxide are more preferable, and α-iron oxide is even more preferable. For the non-magnetic powder included in the back coating layer, the description which will be described later regarding the non-magnetic powder included in the non-magnetic layer can also be referred to.

In general, the inorganic powder tends to have better dispersibility in the back coating layer forming composition, compared to the carbon black. An increase in dispersibility of the non-magnetic powder in the back coating layer forming composition can contribute to a decrease in variation in the shapes of the surface of the back coating layer. Accordingly, as a method of adjusting the FWHM$_{after}$ measured after the vacuum heating which is considered to be a small value, as a variation in shapes of the surface of the back coating layer decreases, a method of adjusting the kind of non-magnetic powder included in the back coating layer, and in a case of including two or more kinds of non-magnetic powders, a method of adjusting a mixing ratio thereof can be used. For example, as a main powder of the non-magnetic powders in the back coating layer (non-magnetic powder included in the non-magnetic powder with the greatest percentage based on mass), the inorganic powder is preferably used. In a case where the non-magnetic powder included in the back coating layer is one or more non-magnetic powder selected from the group consisting of the inorganic powder and carbon black, the content of the inorganic powder with respect to 100.0 parts by mass of the total amount of the non-magnetic powder is preferably greater than 50.0 parts by mass and equal to or smaller than 100.0 parts by mass, more preferably 60.0 parts by mass to 100.0 parts by mass, even more preferably 70.0 parts by mass to 100.0 parts by mass, and still more preferably 80.0 parts by mass to 100.0 parts by mass. For the content (filling percentage) of the non-magnetic powder in the back coating layer, the description which will be described later regarding the non-magnetic powder of the non-magnetic layer can be referred to.

An average particle size of the non-magnetic powder can be, for example, 10 to 200 nm. An average particle size of the inorganic powder is preferably 50 to 200 nm and more preferably 80 to 150 nm. Meanwhile, an average particle size of carbon black is preferably 10 to 50 nm and more preferably 15 to 30 nm.

In addition, the dispersibility of the non-magnetic powder in the back coating layer forming composition can be also increased by using a well-known dispersing agent and reinforcing the dispersion conditions.

A preferred aspect of the adjustment method of the $FWHM_{before}$ measured before the vacuum heating will be described later.

The back coating layer further includes a binding agent and can arbitrarily include well-known additives. For other details of the binding agent and additives of the back coating layer, a well-known technology regarding the back coating layer can be applied, and a well-known technology regarding the magnetic layer and/or the non-magnetic layer can also be applied. In addition, the description which will be described later regarding the magnetic layer and the non-magnetic layer can also be referred to.

Next, the magnetic layer and the like included in the magnetic tape will be described more specifically.

Magnetic Layer

Ferromagnetic Powder

As the ferromagnetic powder included in the magnetic layer, ferromagnetic powder normally used in the magnetic layer of various magnetic recording media can be used. It is preferable to use ferromagnetic powder having a small average particle size, from a viewpoint of improvement of recording density of the magnetic tape. From this viewpoint, ferromagnetic powder having an average particle size equal to or smaller than 50 nm is preferably used as the ferromagnetic powder. Meanwhile, the average particle size of the ferromagnetic powder is preferably equal to or greater than 10 nm, from a viewpoint of stability of magnetization.

As a preferred specific example of the ferromagnetic powder, ferromagnetic hexagonal ferrite powder can be used. An average particle size of the ferromagnetic hexagonal ferrite powder is preferably 10 nm to 50 nm and more preferably 20 nm to 50 nm, from a viewpoint of improvement of recording density and stability of magnetization. For details of the ferromagnetic hexagonal ferrite powder, descriptions disclosed in paragraphs 0012 to 0030 of JP2011-225417A, paragraphs 0134 to 0136 of JP2011-216149A, and paragraphs 0013 to 0030 of JP2012-204726A can be referred to, for example.

As a preferred specific example of the ferromagnetic powder, ferromagnetic metal powder can also be used. An average particle size of the ferromagnetic metal powder is preferably 10 nm to 50 nm and more preferably 20 nm to 50 nm, from a viewpoint of improvement of recording density and stability of magnetization. For details of the ferromagnetic metal powder, descriptions disclosed in paragraphs 0137 to 0141 of JP2011-216149A and paragraphs 0009 to 0023 of JP2005-251351 can be referred to, for example.

In the invention and the specification, average particle sizes of various powder such as the ferromagnetic powder and the like are values measured by the following method with a transmission electron microscope, unless otherwise noted.

The powder is imaged at a magnification ratio of 100,000 with a transmission electron microscope, the image is printed on printing paper so that the total magnification of 500,000 to obtain an image of particles configuring the powder. A target particle is selected from the obtained image of particles, an outline of the particle is traced with a digitizer, and a size of the particle (primary particle) is measured. The primary particle is an independent particle which is not aggregated.

The measurement described above is performed regarding 500 particles arbitrarily extracted. An arithmetical mean of the particle size of 500 particles obtained as described above is an average particle size of the powder. As the transmission electron microscope, a transmission electron microscope H-9000 manufactured by Hitachi, Ltd. can be used, for example. In addition, the measurement of the particle size can be performed by well-known image analysis software, for example, image analysis software KS-400 manufactured by Carl Zeiss. The average particle size shown in examples which will be described later is a value measured by using transmission electron microscope H-9000 manufactured by Hitachi, Ltd. as the transmission electron microscope, and image analysis software KS-400 manufactured by Carl Zeiss as the image analysis software, unless otherwise noted. In the invention and the specification, the powder means an aggregate of a plurality of particles. For example, the ferromagnetic powder means an aggregate of a plurality of ferromagnetic particles. The aggregate of the plurality of particles not only includes an aspect in which particles configuring the aggregate directly come into contact with each other, and also includes an aspect in which a binding agent or an additive which will be described later is interposed between the particles. A term "particles" is also used for describing the powder.

As a method of collecting a sample powder from the magnetic tape in order to measure the particle size, a method disclosed in a paragraph of 0015 of JP2011-048878A can be used, for example.

In the invention and the specification, unless otherwise noted, (1) in a case where the shape of the particle observed in the particle image described above is a needle shape, a fusiform shape, or a columnar shape (here, a height is greater than a maximum long diameter of a bottom surface), the size (particle size) of the particles configuring the powder is shown as a length of a long axis configuring the particle, that is, a long axis length, (2) in a case where the shape of the particle is a planar shape or a columnar shape (here, a thickness or a height is smaller than a maximum long diameter of a plate surface or a bottom surface), the particle size is shown as a maximum long diameter of the plate surface or the bottom surface, and (3) in a case where the shape of the particle is a sphere shape, a polyhedron shape, or an unspecified shape, and the long axis configuring the particles cannot be specified from the shape, the particle size is shown as an equivalent circle diameter. The equivalent circle diameter is a value obtained by a circle projection method.

In addition, regarding an average acicular ratio of the powder, a length of a short axis, that is, a short axis length of the particles is measured in the measurement described above, a value of (long axis length/short axis length) of each particle is obtained, and an arithmetical mean of the values obtained regarding 500 particles is calculated. Here, unless otherwise noted, in a case of (1), the short axis length as the definition of the particle size is a length of a short axis configuring the particle, in a case of (2), the short axis length is a thickness or a height, and in a case of (3), the long axis and the short axis are not distinguished, thus, the value of (long axis length/short axis length) is assumed as 1, for convenience.

In addition, unless otherwise noted, in a case where the shape of the particle is specified, for example, in a case of definition of the particle size (1), the average particle size is an average long axis length, in a case of the definition (2), the average particle size is an average plate diameter, and an average plate ratio is an arithmetical mean of (maximum long diameter/thickness or height). In a case of the definition (3), the average particle size is an average diameter (also referred to as an average particle diameter).

The content (filling percentage) of the ferromagnetic powder of the magnetic layer is preferably 50 to 90 mass % and more preferably 60 to 90 mass %. The components other than the ferromagnetic powder of the magnetic layer are at least a binding agent one or more kinds of additives may be arbitrarily included. A high filling percentage of the ferromagnetic powder in the magnetic layer is preferable from a viewpoint of improvement recording density.

Binding Agent and Curing Agent

The magnetic tape is a coating type magnetic tape, and the magnetic layer includes a binding agent. The binding agent is one or more kinds of resin. As the binding agent, various resins normally used as a binding agent of the coating type magnetic recording medium can be used. For example, as the binding agent, a resin selected from a polyurethane resin, a polyester resin, a polyamide resin, a vinyl chloride resin, an acrylic resin obtained by copolymerizing styrene, acrylonitrile, or methyl methacrylate, a cellulose resin such as nitrocellulose, an epoxy resin, a phenoxy resin, and a polyvinylalkylal resin such as polyvinyl acetal or polyvinyl butyral can be used alone or a plurality of resins can be mixed with each other to be used. Among these, a polyurethane resin, an acrylic resin, a cellulose resin, and a vinyl chloride resin are preferable. These resins may be a homopolymer or a copolymer. These resins can be used as the binding agent even in the back coating layer and/or the non-magnetic layer which will be described later. For the binding agent described above, description disclosed in paragraphs 0028 to 0031 of JP2010-24113A can be referred to. In addition, the binding agent may be a radiation curable resin such as an electron beam-curable resin. For the radiation curable resin, descriptions disclosed in paragraphs 0044 and 0045 of JP2011-048878A can be referred to.

An average molecular weight of the resin used as the binding agent can be, for example, 10,000 to 200,000 as a weight-average molecular weight.

The weight-average molecular weight of the invention and the specification is a value obtained by performing polystyrene conversion of a value measured by gel permeation chromatography (GPC). As the measurement conditions, the following conditions can be used.

GPC device: HLC-8120 (manufactured by Tosoh Corporation)

Column: TSK gel Multipore HXL-M (manufactured by Tosoh Corporation, 7.8 mmID (inner diameter)×30.0 cm)

Eluent: Tetrahydrofuran (THF)

A curing agent can also be used together with a resin which can be used as the binding agent. As the curing agent, in one aspect, a thermosetting compound which is a compound in which a curing reaction (crosslinking reaction) proceeds due to heating can be used, and in another aspect, a photocurable compound in which a curing reaction (crosslinking reaction) proceeds due to light irradiation can be used. At least a part of the curing agent is included in the magnetic layer in a state of being reacted (crosslinked) with other components such as the binding agent, by proceeding the curing reaction in the magnetic layer forming step. In a case where a composition used for forming other layers such as the back coating layer forming composition includes a curing agent, the same applies to a layer formed by using this composition. The preferred curing agent is a thermosetting compound, polyisocyanate is suitable. For details of the polyisocyanate, descriptions disclosed in paragraphs 0124 and 0125 of JP2011-216149A can be referred to, for example. The amount of the curing agent can be, for example, 0 to 80.0 parts by mass with respect to 100.0 parts by mass of the binding agent in the magnetic layer forming composition, and is preferably 50.0 to 80.0 parts by mass, from a viewpoint of improvement of strength of the magnetic layer.

Additive

The magnetic layer includes ferromagnetic powder and a binding agent and, if necessary, may include one or more additives. As the additives, the curing agent described above is used as an example. In addition, examples of the additive included in the magnetic layer include non-magnetic powder (for example, inorganic powder or carbon black), a lubricant, a dispersing agent, a dispersing assistant, an antibacterial agent, an antistatic agent, and an antioxidant. Examples of the non-magnetic powder include non-magnetic powder which can function as an abrasive and non-magnetic powder which can function as a projection formation agent which forms projections suitably protruded from the surface of the magnetic layer (for example, non-magnetic colloidal particles). The average particle size of the colloidal silica (silica colloidal particles) shown in the examples which will be described later is a value obtained by a method disclosed in a paragraph 0015 of JP2011-048878A as a measurement method of an average particle diameter. As the additives, a commercially available product can be suitably selected according to the desired properties, or an additive can be prepared by a well-known method and an arbitrary amount thereof can be used. As an example of the additive which can be used in the magnetic layer including the abrasive, a dispersing agent disclosed in paragraphs 0012 to 0022 of JP2013-131285A can be used as a dispersing agent for improving dispersibility of the abrasive.

The magnetic layer described above can be provided directly on the surface of the non-magnetic support or indirectly through a non-magnetic layer.

Non-Magnetic Layer

Next, the non-magnetic layer will be described. The magnetic tape may include a magnetic layer directly on a surface of a non-magnetic support, or may include a magnetic layer through the non-magnetic layer including non-magnetic powder and a binding agent on the surface of the non-magnetic support. The non-magnetic powder used in the non-magnetic layer may be inorganic powder or organic powder. In addition, carbon black and the like can be used. Examples of the inorganic powder include powders of metal, metal oxide, metal carbonate, metal sulfate, metal nitride, metal carbide, and metal sulfide. These non-magnetic powder can be purchased as a commercially available product or can be manufactured by a well-known method. For details thereof, descriptions disclosed in paragraphs 0146 to 0150 of JP2011-216149A can be referred to. For carbon black which can be used in the non-magnetic layer, descriptions disclosed in paragraphs 0040 and 0041 of JP2010-24113A can be referred to. The content (filling percentage) of the non-magnetic powder of the non-magnetic layer is preferably 50 to 90 mass % and more preferably 60 to 90 mass %.

In regards to other details of a binding agent or additives of the non-magnetic layer, the well-known technology regarding the non-magnetic layer can be applied. In addition, in regards to the type and the content of the binding agent, and the type and the content of the additive, for example, the well-known technology regarding the magnetic layer can be applied.

The non-magnetic layer of the magnetic tape also includes a substantially non-magnetic layer including a small amount of ferromagnetic powder as impurities or intentionally, together with the non-magnetic powder. Here, the substantially non-magnetic layer is a layer having a residual magnetic flux density equal to or smaller than 10 mT, a layer having coercivity equal to or smaller than 7.96 kA/m (100 Oe), or a layer having a residual magnetic flux density equal to or smaller than 10 mT and coercivity equal to or smaller than 7.96 kA/m (100 Oe). It is preferable that the non-magnetic layer does not have a residual magnetic flux density and coercivity.

Non-Magnetic Support

Next, the non-magnetic support (hereinafter, also simply referred to as a "support") will be described. As the non-magnetic support, well-known components such as polyethylene terephthalate, polyethylene naphthalate, polyamide, polyamide imide, aromatic polyamide subjected to biaxial stretching are used. Among these, polyethylene terephthalate, polyethylene naphthalate, and polyamide are preferable. Corona discharge, plasma treatment, easy-bonding treatment, or heating treatment may be performed with respect to these supports in advance.

Various Thickness

The thickness of the non-magnetic support is preferably 3.00 to 20.00 μm, more preferably 3.00 to 10.00 μm, even more preferably 3.00 to 6.00 μm, and particularly preferably 3.00 to 4.50 μm.

A thickness of the magnetic layer can be optimized in accordance with saturation magnetization quantity of the magnetic head used, a head gap length, or a band of a recording signal. The thickness of the magnetic layer is normally 0.01 μm to 0.15 μm, and is preferably 0.02 μm to 0.12 μm and more preferably 0.03 μm to 0.10 μm, from a viewpoint of realizing high-density recording. The magnetic layer may be at least single layer, the magnetic layer may be separated into two or more layers having different magnetic properties, and a configuration of a well-known multilayered magnetic layer can be applied. A thickness of the magnetic layer in a case where the magnetic layer is separated into two or more layers is the total thickness of the layers.

A thickness of the non-magnetic layer is, for example, 0.10 to 1.50 μm and preferably 0.10 to 1.00 μm.

The thickness of the back coating layer is as described above. The thinning of the back coating layer is one of methods for thinning the magnetic tape. From a viewpoint of increasing the recording capacity for 1 reel of the magnetic tape cartridge by thinning the magnetic tape, the total thickness of the magnetic tape is preferably equal to or smaller than 6.00 μm. Meanwhile, from a viewpoint of ease of handling (handleability) of the magnetic tape, the total thickness of the magnetic tape is preferably equal to or greater than 1.00 μm.

The thicknesses of various layers of the magnetic tape and the non-magnetic support can be acquired by a well-known film thickness measurement method. As an example, a cross section of the magnetic tape in a thickness direction is, for example, exposed by a well-known method of ion beams or microtome, and the exposed cross section is observed with a scanning electron microscope. In the cross section observation, various thicknesses can be acquired as a thickness acquired at one position of the cross section in the thickness direction, or an arithmetical mean of thicknesses acquired at a plurality of positions of two or more positions, for example, two positions which are arbitrarily extracted. In addition, the thickness of each layer may be acquired as a designed thickness calculated according to the manufacturing conditions.

Manufacturing Method of Magnetic Tape

Preparation of Each Layer Forming Composition

Each composition for forming the magnetic layer, the back coating layer, or the non-magnetic layer, which is arbitrarily provided, normally includes a solvent, together with various components described above. As the solvent, various organic solvents generally used for manufacturing a coating type magnetic recording medium can be used. Among those, from a viewpoint of solubility of the binding agent normally used in the coating type magnetic recording medium, each layer forming composition preferably includes one or more ketone solvents such as acetone, methyl ethyl ketone, methyl isobutyl ketone, diisobutyl ketone, cyclohexanone, isophorone, and tetrahydrofuran. The amount of the solvent of each layer forming composition is not particularly limited, and can be set to be the same as that of each layer forming composition of a typical coating type magnetic recording medium. In addition, steps of preparing a composition for forming each layer generally include at least a kneading step, a dispersing step, and a mixing step provided before and after these steps, if necessary. Each step may be divided into two or more stages. All of raw materials used in the invention may be added at an initial stage or in a middle stage of each step. In addition, each raw material may be separately added in two or more steps. In order to manufacture the magnetic tape, a well-known manufacturing technology can be used. In the kneading step, an open kneader, a continuous kneader, a pressure kneader, or a kneader having a strong kneading force such as an extruder is preferably used. The details of the kneading processes of these kneaders are disclosed in JP1989-106338A (JP-H01-106338A) and JP1989-79274A (JP-H01-79274A). In addition, in order to disperse each layer forming composition, glass beads and one or more kinds of other dispersion beads can be used as dispersion media. As such dispersion beads, zirconia beads, titania beads, and steel beads which are dispersion beads having high specific gravity are suitable. These dispersion beads can be used by optimizing a particle diameter (bead diameter) and a filling percentage of the dispersion beads. As a dispersing machine, a well-known dispersing machine can be used. The each layer forming composition may be filtered by a well-known method before performing the coating step. The filtering can be performed by using a filter, for example. As the filter used in the filtering, a filter having a hole diameter of 0.01 to 3 μm can be used, for example.

Coating Step, Cooling Step, Heating and Drying Step, Burnishing Treatment Step, Curing Step, and Vibration Imparting Step The magnetic layer can be formed by directly applying the magnetic layer forming composition onto the surface of the non-magnetic support or by performing multilayer coating of the magnetic layer forming composition with the non-magnetic layer forming composition in order or at the same time. For details of the coating for forming each layer, a description disclosed in paragraph 0066 of JP2010-231843A can be referred to.

In a preferred aspect, the magnetic tape can be manufactured by successive multilayer coating of the non-magnetic layer forming composition and the magnetic layer forming composition. A manufacturing step including the successive multilayer coating can be preferably performed as follows. The non-magnetic layer is formed through a coating step of applying a non-magnetic layer forming composition onto a surface of a non-magnetic support to form a coating layer, and a heating and drying step of drying the formed coating layer by a heating process. In addition, the magnetic layer can be formed through a coating step of applying a magnetic layer forming composition onto the surface of the formed non-magnetic layer to form a coating layer, and a heating and drying step of drying the formed coating layer by a heating process.

Meanwhile, the back coating layer is formed on a surface side of the non-magnetic support opposite to the surface where the magnetic layer is formed (or is to be formed). The back coating layer can be preferably formed through a coating step of applying a back coating layer forming composition onto a surface of a non-magnetic support to form a coating layer, and a heating and drying step of drying the formed coating layer by a heating process.

In a preferred aspect, the magnetic tape can be manufactured by a manufacturing method in which a back coating layer forming step includes a coating step of applying a back coating layer forming composition including non-magnetic powder, a binding agent, fatty acid ester, a curing agent, and a solvent onto a surface of a non-magnetic support to form a coating layer, a heating and drying step of drying the coating layer by a heating process, and a curing step of performing a curing process with respect to the coating layer, a cooling step of cooling the coating layer is included between the coating step and the heating and drying step, a burnishing treatment step of performing a burnishing treatment with respect to the surface of the coating layer is included between the heating and drying step and the curing step, and a step of imparting vibration with respect to the back coating layer (vibration imparting step) is included after the curing step.

The inventors have thought that it is preferable to perform the cooling step and the burnishing treatment step in the back coating layer forming step of the manufacturing method, in order to set the logarithmic decrement measured regarding the surface of the back coating layer to be equal to or smaller than 0.060. A more specific description is as follows.

The inventors have surmised that performing the cooling step of cooling the coating layer between the coating step and the heating and drying step contributes to causing pressure sensitive adhesive component separated from the surface of the back coating layer to be localized in the surface and/or a surface layer part in the vicinity of the surface of the coating layer. The inventors have thought that this is because the pressure sensitive adhesive component at the time of solvent volatilization in the heating and drying step is easily moved to the surface and/or the surface layer part of the coating layer, by cooling the coating layer before the heating and drying step. However, the reason thereof is not clear. In addition, the inventors have thought that the pressure sensitive adhesive component can be removed by performing the burnishing treatment with respect to the surface of the coating layer in which the pressure sensitive adhesive component is localized on the surface and/or surface layer part.

The inventors have surmised that performing the curing step after removing the pressure sensitive adhesive component contributes to the setting of the logarithmic decrement measured regarding the surface of the back coating layer to be equal to or smaller than 0.060. However, this is merely a surmise, and the invention is not limited thereto.

In addition, it is thought that, by performing the vibration imparting step, the liquid film of fatty acid ester on the surface of the back coating layer flows and the uniformity of the thickness of the liquid film is improved. Accordingly, it is preferable to perform the vibration imparting step in order to control the $FWHM_{before}$.

Hereinafter, a specific aspect of the manufacturing method of the magnetic tape will be described with reference to FIG. 4, as an example. However, the invention is not limited to the following specific aspect.

Figure 4:
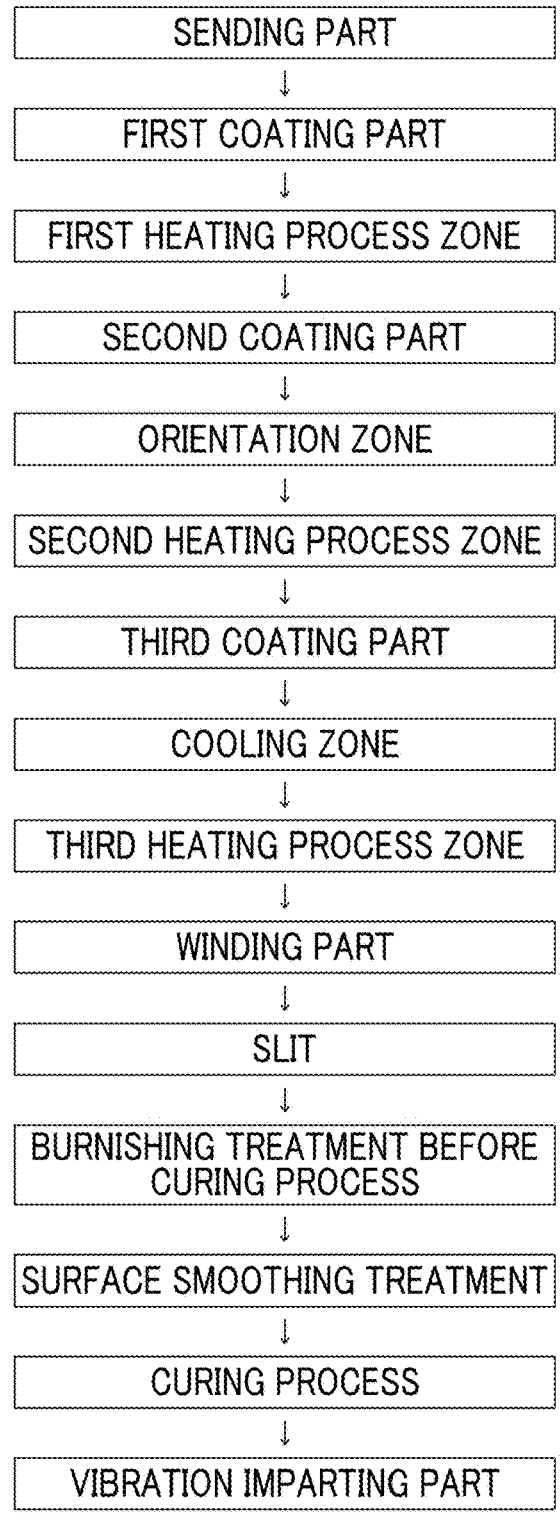
FIG. 4 shows an example (step schematic view) of a specific aspect of a magnetic tape manufacturing step.

FIG. 4 is a step schematic view showing a specific aspect of a step of manufacturing the magnetic tape including a non-magnetic layer and a magnetic layer in this order on one surface side of a non-magnetic support and including a back coating layer on the other surface side thereof. In the aspect shown in FIG. 4, an operation of sending a non-magnetic support (elongated film) from a sending part and winding the non-magnetic support around a winding part is continuously performed, and various processes of coating, drying, and orientation are performed in each part or each zone shown in FIG. 4, and thus, it is possible to sequentially form a non-magnetic layer and a magnetic layer on one surface side of the running non-magnetic support by multilayer coating and to form a back coating layer on the other surface side thereof. Such a manufacturing step can be set to be identical to the manufacturing method normally performed for manufacturing a coating type magnetic recording medium, except for including a cooling zone in the back coating layer forming step and including the burnishing treatment step before the curing process.

The non-magnetic layer forming composition is applied onto the non-magnetic support sent from the sending part in a first coating part, and a coating layer of the non-magnetic layer forming composition is formed (coating step of non-magnetic layer forming composition).

In a first heating process zone, the coating layer of the non-magnetic layer forming composition is dried by heating the formed coating layer (heating and drying step). The heating and drying process can be performed by causing the non-magnetic support including the coating layer after the coating step to pass through the heated atmosphere. An atmosphere temperature of the heated atmosphere here is, for example, approximately 60° to 140°. Here, the atmosphere temperature may be a temperature at which the solvent is volatilized and the coating layer is dried, and the atmosphere temperature is not limited to the range described above. In addition, the heated air may blow to the surface of the coating layer. The points described above are also applied to a heating and drying step of a second heating process zone and a heating and drying step of a third heating process zone which will be described later, in the same manner. In addition, in a case where a coating layer is formed by using the non-magnetic layer forming composition including a radiation curable resin such as an electron beam-curable resin as a binding agent, a curing process of irradiating the coating layer with radiation such as electron beam can be performed. The same applies to the step of forming other layers.

Next, in a second coating part, the magnetic layer forming composition is applied onto the surface of the non-magnetic layer formed by performing the heating and drying step in the first heating process zone, and a coating layer of the magnetic layer forming composition is formed (coating step of magnetic layer forming composition).

After that, while the coating layer of the magnetic layer forming composition is wet, an orientation process of the ferromagnetic powder in the coating layer is performed in an orientation zone. For the orientation process, a description disclosed in a paragraph 0052 of JP2010-24113A can be referred to.

The coating layer after the orientation process is subjected to the heating and drying step in the second heating process zone.

Next, in the third coating part, a back coating layer forming composition is applied to a surface of the non-magnetic support on a side opposite to the surface where the non-magnetic layer and the magnetic layer are formed, to form a coating layer (coating step of back coating layer forming composition).

After the coating step, a coating layer of the back coating layer forming composition formed in the coating step is cooled in a cooling zone (cooling step). For example, it is possible to perform the cooling step by allowing the non-magnetic support on which the coating layer is formed to pass through a cooling atmosphere. An atmosphere temperature of the cooling atmosphere is preferably $-10°$ C. to $0°$ C. and more preferably $-5°$ C. to $0°$ C. The time for performing the cooling step (for example, time while an arbitrary part of the coating layer is delivered to and sent from the cooling zone (hereinafter, also referred to as a "staying time")) is not particularly limited. In a case where the staying time is long, the value of logarithmic decrement tends to be increased. Thus, the staying time is preferably adjusted by performing preliminary experiment if necessary, so that the logarithmic decrement equal to or smaller than 0.060 is realized. In the cooling step, cooled air may blow to the surface of the coating layer.

After that, the coating layer after the cooling step is heated and dried in the third heating process zone.

By doing so, it is possible to obtain the magnetic tape including the non-magnetic layer and the magnetic layer in this order on one surface side of the non-magnetic support, and the coating layer of the back coating layer forming composition heated and dried on the other surface side thereof. The magnetic tape obtained here becomes a magnetic tape product after performing various processes which will be described later.

The obtained magnetic tape is wound around the winding part, and cut (slit) to have a size of a magnetic tape product. The slitting is performed by using a well-known cutter.

In the slit magnetic tape, the burnishing treatment is performed with respect to the surface of the heated and dried coating layer of the back coating layer forming composition, before performing the curing process (heating and light irradiation) in accordance with the types of the curing agent included in the back coating layer forming composition (burnishing treatment step between heating and drying step and curing step). The inventors have surmised that removing the pressure sensitive adhesive component transitioned to the surface and/or the surface layer part of the coating layer cooled in the cooling zone by the burnishing treatment contributes setting the logarithmic decrement to be equal to or smaller than 0.060. However, as described above, this is merely a surmise, and the invention is not limited thereto.

The burnishing treatment is treatment of rubbing a surface of a treatment target with a member (for example, a polishing tape, or a grinding tool such as a grinding blade or a grinding wheel), and can be performed in the same manner as the well-known burnishing treatment for manufacturing a coating type magnetic recording medium. However, in the related art, the burnishing treatment was not performed in a stage before the curing step, after performing the cooling step and the heating and drying step. With respect to this, the logarithmic decrement can be equal to or smaller than 0.060 by performing the burnishing treatment in the stage described above.

The burnishing treatment can be preferably performed by performing one or both of rubbing of the surface of the coating layer of the treatment target by a polishing tape (polishing) and rubbing of the surface of the coating layer of the treatment target by a grinding tool (grinding). As the polishing tape, a commercially available product may be used and a polishing tape manufactured by a well-known method may be used. As the grinding tool, a well-known blade such as a fixed blade, a diamond wheel, or a rotary blade, or a grinding wheel can be used. In addition, a wiping treatment of wiping the surface of the coating layer rubbed by the polishing tape and/or the grinding tool with a wiping material. For details of preferred polishing tape, grinding tool, burnishing treatment, and wiping treatment, descriptions disclosed in paragraphs 0034 to 0048, FIG. 1 and examples of JP1994-52544A (JP-H06-52544A) can be referred to. As the burnishing treatment is reinforced, the value of the logarithmic decrement tends to be decreased. The burnishing treatment can be reinforced as an abrasive having high hardness is used as the abrasive included in the polishing tape, and can be reinforced, as the amount of the abrasive in the polishing tape is increased. In addition, the burnishing treatment can be reinforced as a grinding tool having high hardness is used as the grinding tool. In regards to the burnishing treatment conditions, the burnishing treatment can be reinforced as a sliding speed between the surface of the coating layer of the treatment target and a member (for example, a polishing tape or a grinding tool) is increased. The sliding speed can be increased by increasing one or both of a speed at which the member is moved, and a speed at which the magnetic tape of the treatment target is moved.

After the burnishing treatment (burnishing treatment step), the curing process is performed with respect to the coating layer of the back coating layer forming composition. In the aspect shown in FIG. 4, the coating layer of the back coating layer forming composition is subjected to the surface smoothing treatment, after the burnishing treatment and before the curing process. The surface smoothing treatment is a process performed for increasing smoothness of the surface of the magnetic layer and/or the surface of the back coating layer of the magnetic tape and is preferably performed by a calender process. For details of the calender process, for example, description disclosed in a paragraph 0026 of JP2010-231843A can be referred to. As the calender process is reinforced, the surface of the magnetic tape can be smoothened. The calender process is reinforced, as the surface temperature (calender temperature) of a calender roll is increased and/or as calender pressure is increased.

After that, the curing process according to the type of the curing agent included in the coating layer is performed with respect to the coating layer of the back coating layer forming composition (curing step). The curing process can be performed by the process according to the type of the curing agent included in the coating layer, such as a heating process or light irradiation. The curing process conditions are not particularly limited, and the curing process conditions may be suitably set in accordance with the list of the back coating layer forming composition used in the coating layer formation, the type of the curing agent, and the thickness of the coating layer. For example, in a case where the coating layer is formed by using the back coating layer forming composition including polyisocyanate as the curing agent, the curing process is preferably the heating process. In a case where the curing agent is included in a layer other than the back coating layer, a curing reaction of the layer can also proceed by the curing process here. Alternatively, the curing step may be separately provided. After the curing step, the burnishing treatment may be further performed.

Then, the vibration is imparted to the back coating layer in a vibration imparting part (vibration imparting step). A vibration imparting method is not particularly limited. For example, the vibration can be imparted to the back coating layer by bringing the surface of the non-magnetic support on which the back coating layer is formed on a side opposite to the back coating layer, into contact with a vibration imparting unit. The non-magnetic support on which the back coating layer is formed may be allowed to run while coming into contact with a vibration imparting unit. The vibration imparting unit, for example, includes an ultrasonic vibrator therein and thus, can impart vibration to a product coming into contact with the unit. A degree of the vibration imparted to the back coating layer can be adjusted with a vibration frequency or a strength of the ultrasonic vibrator and/or a contact time with the vibration imparting unit. For example, the contact time can be adjusted by a running speed while the non-magnetic support on which the back coating layer is formed comes into contact with the vibration imparting unit. These vibration imparting conditions are not particularly limited, and may be set so as to control the full width at half maximum of the spacing distribution described above, particularly, the $FWHM_{before}$ measured before the vacuum heating. A preliminary experiment is performed before the manufacturing, in order to set the vibration imparting conditions, and the conditions can be optimized.

As described above, it is possible to obtain the magnetic tape according to one aspect of the invention. However, the manufacturing method described above is merely an example, various values measured regarding the surface of the back coating layer can be controlled by arbitrary means for adjusting the logarithmic decrement, the difference $(S_{after}-S_{before})$, the $FWHM_{before}$, and the $FWHM_{after}$, and such an aspect is also included in the invention.

The magnetic tape according to one aspect of the invention described above is a magnetic tape including a back coating layer having a thickness equal to or smaller than 0.30 μm and can be a magnetic tape in which occurrence of edge damage is prevented. In recent years, realization of a high speed of recording and/or reproducing is desired. With this, an increase in a running speed of the magnetic tape is promoted. The running speed of the magnetic tape is also called a transportation speed and is a relative speed of the magnetic tape and the magnetic head at the time of the magnetic tape running. Generally, as an increase in running speed is promoted, the disordered winding tends to easily occur, and thus, the edge damage tends to easily occur. In contrast, according to the magnetic tape according to one aspect of the invention, it is possible to prevent the occurrence of the edge damage as described above. Accordingly, the magnetic tape according to one aspect of the invention is a magnetic tape which can deal with the realization of a high speed of recording and/or reproducing. As an example, the running speed can be equal to or higher than 3 m/sec, preferably equal to or higher than 5 m/sec and, for example, 5 to 20 m/sec. However, the running speed is not particularly limited to this range, and the magnetic tape according to one aspect of the invention can be suitably used for recording and/or reproducing information by running at various running speeds.

EXAMPLES

Hereinafter, the invention will be described with reference to examples. However, the invention is not limited to aspects shown in the examples. "Parts" in the following description mean "parts by mass".

Example 1

Magnetic Layer Forming Composition
Magnetic Solution
Ferromagnetic hexagonal barium ferrite powder: 100.0 parts
  (coercivity He: 2,100 Oe (168 kA/m), average particle size: 25 nm)
Sulfonic acid-containing polyurethane resin: 15.0 parts
Cyclohexanone: 150.0 parts
Methyl ethyl ketone: 150.0 parts
Abrasive Liquid
  α-alumina (average particle size of 110 nm): 9.0 parts
  A vinyl chloride copolymer: (MR110 manufactured by Zeon Corporation): 0.7 parts
  Cyclohexanone: 20.0 parts
Silica Sol
  Colloidal silica (average particle size: 120 nm): 3.5 parts
  Methyl ethyl ketone: 8.2 parts
Other Components
  Butyl stearate: 2.0 parts
  Stearic acid: 2.0 parts
  Polyisocyanate (CORONATE manufactured by Nippon Polyurethane Industry Co., Ltd.): 2.5 parts
Finishing Additive Solvent
  Cyclohexanone: 180.0 parts
  Methyl ethyl ketone: 180.0 parts
Non-Magnetic Layer Forming Composition
Non-magnetic inorganic powder (α-iron oxide): 80.0 parts
  (average particle size: 150 nm, average acicular ratio: 7, Brunauer-Emmett-Teller (BET) specific surface area: 52 $m^2/g$)
Carbon black (average particle size of 20 nm): 20.0 parts
An electron beam-curable vinyl chloride copolymer: 13.0 parts
An electron beam-curable polyurethane resin: 6.0 parts
Phenylphosphonic acid: 3.0 parts
Cyclohexanone: 140.0 parts
Methyl ethyl ketone: 170.0 parts
Butyl stearate: 2.0 parts
Stearic acid: 1.0 part
Back Coating Layer Forming Composition
Non-magnetic powder: 100.0 parts
  Inorganic powder (α-iron oxide): see Table 1 regarding a ratio
    (average particle size: 150 nm, average acicular ratio: 7, BET specific surface area: 52 $m^2/g$)
  Carbon black (average particle size of 20 nm): see Table 1 regarding a ratio
A vinyl chloride copolymer: 13.0 parts
A sulfonic acid-containing polyurethane resin: 6.0 parts Phenylphosphonic acid: 3.0 parts
Cyclohexanone: 140.0 parts
Methyl ethyl ketone: 170.0 parts
Butyl stearate: see Table 1
Stearic acid: 2.0 parts
Polyisocyanate (CORONATE manufactured by Nippon Polyurethane Industry Co., Ltd.): 5.0 parts
Methyl ethyl ketone: 400.0 parts
Preparation of Each Layer Forming Composition The magnetic layer forming composition was prepared by the following method.

The magnetic solution was kneaded and diluted by an open kneader, and subjected to a dispersion process of 12 passes, with a transverse beads mill dispersing device and zirconia ($ZrO_2$) beads (hereinafter, referred to as "Zr beads") having a particle diameter of 0.5 mm, by setting a bead filling percentage as 80 volume %, a circumferential speed of rotor distal end as 10 m/sec, and a retention time for 1 pass as 2 minutes.

After mixing the components described above, the abrasive liquid was put in a vertical sand mill dispersing device together with Zr beads having a particle diameter of 1 mm, the bead volume/(abrasive liquid volume+bead volume) was adjusted to be 60%, the sand mill dispersing process was performed for 180 minutes, a solution after the process was extracted, and an ultrasonic dispersion filtering process was performed with a flow-type ultrasonic dispersion filtering device.

The magnetic solution, the silica sol, the abrasive liquid, other components, and the finishing additive solvent were introduced into a dissolver stirring device, and were stirred at a circumferential speed of 10 m/sec for 30 minutes. After that, the treatment was performed with a flow-type ultrasonic dispersion device at a flow rate of 7.5 kg/min for 20 times of the passes, and then, a magnetic layer forming composition was prepared by performing filtering with a filter having a hole diameter of 0.5 μm five times.

The non-magnetic layer forming composition was prepared by the following method.

Each component excluding a lubricant (butyl stearate and stearic acid) was kneaded with an open kneader and diluted, and then, was dispersed by using a transverse beads mill dispersing device. After that, the lubricant (butyl stearate and stearic acid) was added thereto, and stirred and mixed with a dissolver stirring device, to prepare a non-magnetic layer forming composition.

The back coating layer forming composition was prepared by the following method.

Each component excluding the lubricant (butyl stearate and stearic acid), polyisocyanate, and methyl ethyl ketone (400.0 parts) was kneaded with an open kneader and diluted, and then, was dispersed by using a transverse beads mill dispersing device. After that, the lubricant (butyl stearate and stearic acid), polyisocyanate, and methyl ethyl ketone (400.0 parts) were added thereto, and stirred and mixed with a dissolver stirring device, to prepare a back coating layer forming composition.

Manufacturing of Magnetic Tape

A magnetic tape was manufactured by the specific aspect shown in FIG. 4. The magnetic tape was specifically manufactured as follows.

A support made of polyethylene naphthalate having a thickness shown in Table 1 was sent from the sending part, and the non-magnetic layer forming composition was applied to one surface thereof so that the thickness after the drying becomes a thickness shown in Table 1 in the first coating part and was dried in the first heating process zone (atmosphere temperature of 100° C.) to form a coating layer. The formed coating layer was irradiated with an electron beam with an energy of 40 kGy at an acceleration voltage of 125 kV.

Then, the magnetic layer forming composition was applied onto the non-magnetic layer so that the thickness after the drying becomes the thickness shown in Table 1 in the second coating part, and a coating layer was formed. A homeotropic alignment process was performed in the orientation zone by applying a magnetic field having a magnetic field strength of 0.3 T in a vertical direction with respect to the surface of the coating layer, while the formed coating layer is wet, and then, the coating layer was dried in the second heating process zone (atmosphere temperature of 100° C.).

After that, in the third coating part, the back coating layer forming composition was applied to the surface of the support made of polyethylene naphthalate on a side opposite to the surface where the non-magnetic layer and the magnetic layer are formed, so that the thickness after the drying becomes the thickness shown in Table 1, to form a coating layer, and the cooling step was performed by causing the coating layer to pass through a cooling zone in which the atmosphere temperature was adjusted to 0° C. for the staying time shown in Table 1, while the formed coating layer is wet. After that, the coating layer was dried in the third heating process zone (atmosphere temperature of 100° C.).

The magnetic tape obtained as described above was slit to have a width of ½ inches (0.0127 meters), and the burnishing treatment and the wiping treatment were performed with respect to the surface of the coating layer of the back coating layer forming composition. The burnishing treatment and the wiping treatment were performed by using a commercially available polishing tape (product name: MA22000 manufactured by Fujifilm Corporation, abrasive: diamond/$Cr_2O_3$/red oxide) as the polishing tape, a commercially available sapphire blade (manufactured by Kyocera Corporation, a width of 5 mm, a length of 35 mm, and a tip angle of 60 degrees) as the grinding blade, and a commercially available wiping material (product name: WRP736 manufactured by Kuraray Co., Ltd.) as the wiping material, in a treatment device having a configuration disclosed in FIG. 1 of JP1994-52544A (JP-H06-52544A). For the treatment conditions, the treatment conditions disclosed in Example 12 of JP1994-52544A (JP-H06-52544A).

After the burnishing treatment and the wiping treatment, a calender process (surface smoothing treatment) was performed with a calender roll configured of only a metal roll, at a speed of 80 m/min, linear pressure of 300 kg/cm (294 kN/m), and a calender temperature (surface temperature of a calender roll) of 100° C.

Figure 5:
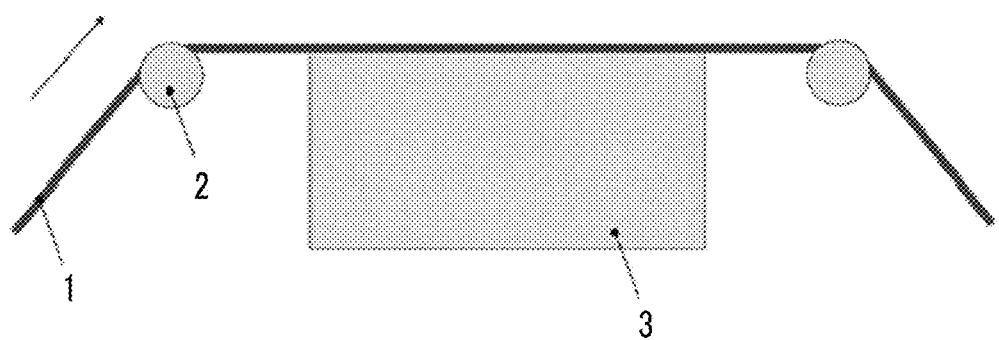
FIG. 5 is a schematic configuration diagram of a vibration imparting device used in examples.

After that, a curing process (heating process) was performed in the environment of the atmosphere temperature of 70° C. for 36 hours, and then, the vibration was imparted to the back coating layer in the vibration imparting part. Specifically, the support, provided with the back coating layer, was installed in a vibration imparting device shown in FIG. 5 so that the surface thereof on a side opposite to the surface where the back coating layer is formed comes into contact with the vibration imparting unit, and the support provided with the back coating layer (reference numeral 1 in FIG. 5) is transported at a transportation speed of 0.5 m/sec to impart the vibration to the back coating layer. In FIG. 5, a reference numeral 2 denotes a guide roller (a reference numeral 2 denotes one of two guide rollers), a reference numeral 3 denotes the vibration imparting device (vibration imparting unit including the ultrasonic vibrator), and an arrow denotes a transportation direction. The time from the start of the contact of the arbitrary portion of the support, provided with the back coating layer formed, with the vibration imparting unit until the end of the contact is shown in Table 1 as the vibration imparting time. The vibration imparting unit used includes an ultrasonic vibrator therein. The vibration was imparted by setting a vibration frequency and the intensity of the ultrasonic vibrator as values shown in Table 1.

By doing so, the magnetic tape of Example 1 was manufactured.

Examples 2 to 9 and Comparative Examples 1 to 16

A magnetic tape was manufactured by the same method as that in Example 1, except that various conditions were changed as shown in Table 1. The vibration imparting time was adjusted by changing the transportation speed of the support provided with the back coating layer.

The amount of inorganic powder/carbon black used in the back coating layer shown in Table 1 is content of each powder by mass with respect to 100.0 parts by mass of a total content of the non-magnetic powders (inorganic powder and carbon black).

In Table 1, in the comparative examples in which "not performed" is disclosed in a column of the cooling zone staying time of the back coating layer forming step and a column of the burnishing process before the curing process, a magnetic tape was manufactured by a manufacturing step not including the cooling zone in the back coating layer forming step and not performing the burnishing treatment and the wiping treatment.

The thickness of each layer and the non-magnetic support of each magnetic tape of the examples and the comparative examples was acquired by the following method. It was confirmed that the thicknesses of the formed layer and the non-magnetic support was the thicknesses shown in Table 1.

A cross section of the magnetic tape in a thickness direction was exposed to ion beams and the exposed cross section was observed with a scanning electron microscope.

Various thicknesses were obtained as an arithmetical mean of thicknesses obtained at two portions in the thickness direction in the cross section observation.

Evaluation of Physical Properties of Magnetic Tape

1. Logarithmic Decrement Measured Regarding Surface of Back Coating Layer

The logarithmic decrement of the surface of the back coating layer of each magnetic tape of the examples and the comparative examples was acquired by the method described above by using a rigid-body pendulum type physical properties testing instrument RPT-3000W manufactured by A&D Company, Limited (pendulum: brass, substrate: glass substrate, a rate of temperature increase of substrate: 5° C./min) as the measurement device. A measurement sample cut out from each magnetic tape of the examples and the comparative examples was placed on a glass substrate having a size of approximately 3 cm×approximately 5 cm, by being fixed at 4 portions with a fixing tape (Kapton tape manufactured by Du Pont-Toray Co., Ltd.) as shown in FIG. 1. An adsorption time was set as 1 second, a measurement interval was set as 7 to 10 seconds, a displacement-time curve was drawn regarding the 86-th measurement interval, and the logarithmic decrement was acquired by using this curve. The measurement was performed in the environment of relative humidity of approximately 50%.

2. $FWHM_{before}$ and $FWHM_{after}$

The $FWHM_{before}$ and $FWHM_{after}$ were acquired by the following method by using a tape spacing analyzer (TSA) (manufactured by Micro Physics, Inc.).

In a state where a glass sheet included in the TSA was disposed on the surface of the back coating layer of the magnetic tape, a hemisphere was pressed against the surface of the magnetic layer of the magnetic tape at a pressure of $5.05 \times 10^4$ N/m (0.5 atm) by using a hemisphere made of urethane included in the TSA as a pressing member. In this state, a given region (150,000 to 200,000 µm$^2$) of the surface of the back coating layer of the magnetic tape was irradiated with white light from a stroboscope included in the TSA through the glass sheet, and the obtained reflected light was received by a charge-coupled device (CCD) through an interference filter (filter selectively passing light at a wavelength of 633 nm), and thus, an interference fringe image generated on the uneven part of the region was obtained.

This image was divided into 300,000 points, a distance (spacing) between the surface of the glass sheet on the magnetic tape side and the surface of the back coating layer of the magnetic tape was acquired, and the full width at half maximum of spacing distribution was full width at half maximum, in a case where this spacing was shown with a histogram, and this histogram was fit with Gaussian distribution, to obtain the $FWHM_{before}$ measured before the vacuum heating and $FWHM_{after}$ measured after the vacuum heating.

The vacuum heating was performed by storing the magnetic tape in a vacuum constant temperature drying machine with a degree of vacuum of 200 Pa to 0.01 Mpa and at inner atmosphere temperature of 70° C. to 90° C. for 24 hours.

3. Difference ($S_{after} - S_{before}$)

The difference ($S_{after} - S_{before}$) was a value obtained by subtracting a mode of the histogram before the vacuum heating from a mode of the histogram after the vacuum heating obtained in the section 2.

Evaluation of Performance of Magnetic Tape

Evaluation of Edge Damage

A magnetic tape cartridge accommodating each magnetic tape (magnetic tape total length of 500 m) of the examples and the comparative examples was set in a drive of Linear Tape-Open Generation 6 (LTO-G6) manufactured by IBM, and the magnetic tape was subjected to reciprocating running 1,500 times at tension of 0.6 N and a running speed of 5 m/sec.

The magnetic tape cartridge after the running was set in a reference drive (LTO-G6 drive manufactured by IBM), and the magnetic tape is allowed to run to perform the recording and reproducing. A reproduction signal during the running was introduced to an external analog/digital (AD) conversion device. A signal having a reproducing signal amplitude which is decreased 70% or more than an average (average of measured values at each track) respectively in a track closest to one edge of the magnetic tape and a track closest to the other edge thereof was set as a missing pulse, a generation frequency (number of times of the generation) thereof was divided by the total length of the magnetic tape to obtain a missing pulse generation frequency per unit length of the magnetic tape (per 1 m) (hereinafter, referred to as the "number of missing pulses").

As the edge damage heavily occurs, the number of missing pulses obtained by the method described above increases. Accordingly, the number of missing pulses obtained by the method described above becomes an index for the edge damage. In a case where the number of missing pulses is equal to or smaller than 10.0 number/m, it is possible to determine that the occurrence of the edge damage is prevented to a sufficient practical level. The position where the edge damage occurs is not constant, and therefore, in this evaluation, the measurement result having a large number of missing pulses was used as the number of missing pulses, among the measurement result in a track closest to one edge and the measurement result in a track closest to the other edge, and was shown in Table 1.

In Comparative Example 16, it was difficult to bring the surface of the magnetic layer into contact with the magnetic head for sliding, due to the effect of materials attached to the surface of the magnetic layer during the running (running trouble), and thus, the evaluation was stopped. It is surmised that the materials attached to the surface of the magnetic layer were the cut scraps which were generated due to chipping of the surface of the back coating layer and were attached to the surface of the magnetic layer.

The results described above are shown in Table 1.

TABLE 1

|  |  | Example 1 | Example 2 | Example 3 | Example 4 | Example 5 | Example 6 | Example 7 | Example 8 | Example 9 |
|---|---|---|---|---|---|---|---|---|---|---|
| Magnetic layer thickness | | 0.10 μm | 0.10 μm | 0.10 μm | 0.10 μm | 0.10 μm | 0.10 μm | 0.10 μm | 0.10 μm | 0.10 μm |
| Non-magnetic layer thickness | | 1.00 μm | 1.00 μm | 0.10 μm | 1.00 μm | 1.00 μm | 1.00 μm | 1.00 μm | 1.00 μm | 1.00 μm |
| Non-magnetic support thickness | | 4.30 μm | 4.30 μm | 3.60 μm | 4.30 μm | 4.30 μm | 4.30 μm | 4.30 μm | 4.30 μm | 4.30 μm |
| Back coating layer thickness | | 0.30 μm | 0.20 μm | 0.20 μm | 0.30 μm | 0.30 μm | 0.20 μm | 0.20 μm | 0.20 μm | 0.30 μm |
| Total thickness of magnetic tape | | 5.70 μm | 5.60 μm | 4.00 μm | 5.70 μm | 5.70 μm | 5.60 μm | 5.60 μm | 5.60 μm | 5.70 μm |
| Back coating layer forming step | Cooling zone staying time | 1 second | 1 second | 1 second | 60 seconds | 180 seconds | 60 seconds | 1 second | 180 seconds | 1 second |
| | Burnishing treatment before curing process | Performed | Performed | Performed | Performed | Performed | Performed | Performed | Performed | Performed |
| Back coating layer forming composition | Content of Butyl stearate | 2.0 parts | 2.0 parts | 2.0 parts | 2.0 parts | 2.0 parts | 2.0 parts | 2.0 parts | 2.0 parts | 2.0 parts |
| | Ratio of inorganic powder/carbon black | 80/20 | 80/20 | 80/20 | 80/20 | 80/20 | 80/20 | 80/20 | 80/20 | 100/0 |
| Back coating layer vibration imparting conditions | Vibration imparting time sec | 0.8 | 0.8 | 0.8 | 0.8 | 0.8 | 0.8 | 0.8 | 0.8 | 2 |
| | Vibration frequency kHz | 30 | 30 | 30 | 30 | 30 | 30 | 30 | 30 | 30 |
| | Strength W | 100 | 100 | 100 | 100 | 100 | 100 | 100 | 100 | 100 |
| Back coating layer | Logarithmic decrement | 0.058 | 0.058 | 0.058 | 0.047 | 0.031 | 0.047 | 0.058 | 0.031 | 0.056 |
| | $FWHM_{before}$ | 8.0 | 8.0 | 8.0 | 8.0 | 8.0 | 8.0 | 8.0 | 8.0 | 2.0 |
| | $FWHM_{after}$ | 8.0 | 8.0 | 8.0 | 8.0 | 8.0 | 8.0 | 8.0 | 8.0 | 2.0 |
| | $S_{after}-S_{before}$ | 3.0 | 2.0 | 2.0 | 3.0 | 3.0 | 2.0 | 2.0 | 1.0 | 3.0 |
| Number of generation missing pulses [number/m] | | 4.0 | 4.5 | 4.8 | 3.0 | 2.8 | 2.9 | 2.7 | 3.1 | 3.8 |

|  |  | Comparative Example 1 | Comparative Example 2 | Comparative Example 3 | Comparative Example 4 | Comparative Example 5 | Comparative Example 6 | Comparative Example 7 | Comparative Example 8 | Comparative Example 9 |
|---|---|---|---|---|---|---|---|---|---|---|
| Magnetic layer thickness | | 0.10 μm | 0.10 μm | 0.10 μm | 0.10 μm | 0.10 μm | 0.10 μm | 0.10 μm | 0.10 μm | 0.10 μm |
| Non-magnetic layer thickness | | 1.00 μm | 0.50 μm | 0.10 μm | 1.00 μm | 1.00 μm | 0.10 μm | 1.00 μm | 1.00 μm | 1.00 μm |
| Non-magnetic support thickness | | 4.30 μm | 4.30 μm | 4.30 μm | 3.80 μm | 3.40 μm | 3.40 μm | 4.30 μm | 4.30 μm | 4.30 μm |
| Back coating layer thickness | | 0.60 μm | 0.60 μm | 0.60 μm | 0.60 μm | 0.60 μm | 0.60 μm | 0.40 μm | 0.30 μm | 0.20 μm |
| Total thickness of magnetic tape | | 6.00 μm | 5.50 μm | 5.10 μm | 5.50 μm | 5.10 μm | 4.20 μm | 5.80 μm | 5.70 μm | 5.60 μm |
| Back coating layer forming step | Cooling zone staying time | Not performed | Not performed | Not performed | Not performed | Not performed | Not performed | Not performed | Not performed | Not performed |
| | Burnishing treatment before curing process | Not performed | Not performed | Not performed | Not performed | Not performed | Not performed | Not performed | Not performed | Not performed |
| Back coating layer forming composition | Content of Butyl stearate | 2.0 parts | 2.0 parts | 2.0 parts | 2.0 parts | 2.0 parts | 2..0 parts | 2.0 parts | 2.0 parts | 2.0 parts |
| | Ratio of inorganic powder/carbon black | 80/20 | 80/20 | 80/20 | 80.90 | 80/20 | 80/20 | 80/20 | 80/20 | 80/20 |
| Back coating layer vibration imparting conditions | Vibration imparting tim sec | None | None | None | None | None | None | None | None | None |
| | Vibration frequency kHz | None | None | None | None | Not | None | None | None | None |
| | Strength W | None | None | None | None | None | None | None | Noire | None |
| Back coating layer | Logarithmic decrement | 0.071 | 0.071 | 0.071 | 0.071 | 0.071 | 0.071 | 0.071 | 0.069 | 0.073 |
| | $FWHM_{before}$ | 13.0 | 13.0 | 13.0 | 13.0 | 1.3.0 | 13.0 | 13.0 | 13.0 | 13.0 |
| | $FWHM_{after}$ | 8.0 | 8.0 | 8.0 | 8.0 | 8.0 | 8.0 | 8.0 | 8.0 | 8.0 |
| | $S_{after}-S_{before}$ | 6.0 | 6.0 | 6.0 | 6.0 | 6.0 | 6.0 | 4.0 | 3.0 | 2.0 |
| Number of generation missing pulses [number/m] | | 3.2 | 4.5 | 7.0 | 4.5 | 5.8 | 8.2 | 5.7 | 15.5 | 17.3 |

|  |  | Comparative Example 10 | Comparative Example 11 | Comparative Example 12 | Comparative Example 13 | Comparative Example 14 | Comparative Example 15 | Comparative Example 16 |
|---|---|---|---|---|---|---|---|---|
| Magnetic layer thickness | | 0.10 μm | 0.10 μm | 0.10 μm | 0.10 μm | 0.10 μm | 0.10 μm | 0.10 μm |
| Non-magnetic layer thickness | | 1.00 μm | 1.00 μm | 1.00 μm | 1.00 μm | 1.00 μm | 1.00 μm | 1.00 μm |
| Non-magnetic support thickness | | 4.30 μm | 4.30 μm | 4.30 μm | 4.30 μm | 4.30 μm | 4.30 μm | 4.30 μm |

TABLE 1-continued

| | | | | | | | | |
|---|---|---|---|---|---|---|---|---|
| Back coating layer thickness | | 0.20 μm | 0.30 μm | 0.30 μm | 0.30 μm | 0.30 μm | 0.30 μm | 0.30 μm |
| Total thickness of magnetic tape | | 5.60 μm | 5.70 μm | 5.70 μm | 5.70 μm | 5.70 μm | 5.70 μm | 5.70 μm |
| Back coating layer forming step | Cooling zone staying time | Not performed | 1 second | 180 seconds | 180 seconds | Not performed | Not performed | 180 seconds |
| | Burnishing treatment before curing process | Not performed | Performed | Performed | Performed | Not performed | Not performed | Performed |
| Back coating layer forming composition | Content or Butyl stearate | 2.0 parts | 2.0 parts | 2.0 parts | 2.0 parts | 2.0 parts | 2.0 parts | 0 parts |
| | Ratio of inorganic powder/carbon black | 80/20 | 80/20 | 80/20 | 0/100 | 80/20 | 100/0 | 80/20 |
| Back coating layer vibration imparting conditions | Vibration imparting time sec | 0.8 | None | None | 0.8 | 0.8 | 2 | 0.8 |
| | Vibration frequency kHz | 30 | None | None | 30 | 30 | 30 | 30 |
| | Strength W | 100 | None | None | 100 | 100 | 100 | 100 |
| Back coating layer | Logarithmic decrement | 0.073 | 0.058 | 0.031 | 0.031 | 0.069 | 0.069 | 0.031 |
| | $FWHM_{before}$ | 8.0 | 13.0 | 13.0 | 8.0 | 8.0 | 2.0 | 8.0 |
| | $FWHM_{after}$ | 8.0 | 8.0 | 8.0 | 12.0 | 8.0 | 2.0 | 8.0 |
| | $S_{after}-S_{before}$ | 2.0 | 3.0 | 3.0 | 3.0 | 3.0 | 3.0 | 0 |
| Number of generation missing pulses [number/m] | | 16.4 | 17.1 | 17.4 | 17.4 | 15.3 | 12.3 | — |

In the magnetic tapes of Comparative Examples 1 to 7 in which the thickness of the back coating layer is greater than 0.30 μm, the number of missing pulses was equal to or smaller than 10.0 number/m, even in a case where various values measured regarding the surface of the back coating layer were not in the ranges described above. In contrast, in the magnetic tapes of Comparative Examples 8 to 16 in which the thickness of the back coating layer is equal to or smaller than 0.30 μm and the logarithmic decrement, the difference ($S_{after}-S_{before}$), the $FWHM_{before}$, and the $FWHM_{after}$ measured regarding the surface of the back coating layer are not in the ranges described above, the number of missing pulses exceeded 10.0 number/m. From the results described above, it was confirmed that, in a case where the back coating layer is thinned to have a thickness equal to or smaller than 0.30 μm and measures are not prepared, the edge damage occurs.

With respect to this, with the comparison of Examples 1 to 9 and Comparative Examples 8 to 16, it is possible to confirm that it is possible to prevent the occurrence of the edge damage, by setting the logarithmic decrement, the difference ($S_{after}-S_{before}$), the $FWHM_{before}$, and the $FWHM_{after}$ measured regarding the surface of the back coating layer to be in the ranges described above, in the magnetic tape in which the thickness of the back coating layer is equal to or smaller than 0.30 μm.

The invention is effective in the technical fields of magnetic tapes such as back-up tapes.

What is claimed is:

1. A magnetic tape comprising:
a non-magnetic support;
a magnetic layer including ferromagnetic powder and a binding agent on one surface side of the non-magnetic support; and
a back coating layer including non-magnetic powder and a binding agent on the other surface side of the non-magnetic support,
wherein the thickness of the back coating layer is equal to or smaller than 0.30 μm,
the back coating layer includes fatty acid ester,
the logarithmic decrement acquired by a pendulum viscoelasticity test performed regarding the surface of the back coating layer is equal to or smaller than 0.060,
the full width at half maximum of spacing distribution measured by optical interferometry regarding the surface of the back coating layer before performing a vacuum heating with respect to the magnetic tape is greater than 0 nm and equal to or smaller than 10.0 nm,
the full width at half maximum of spacing distribution measured by optical interferometry regarding the surface of the back coating layer after performing the vacuum heating with respect to the magnetic tape is greater than 0 nm and equal to or smaller than 10.0 nm,
the difference $S_{after}-S_{before}$ between a spacing $S_{uer}$ measured by optical interferometry regarding the surface of the back coating layer after performing the vacuum heating with respect to the magnetic tape and a spacing $S_{before}$ measured by optical interferometry regarding the surface of the back coating layer before performing the vacuum heating with respect to the magnetic tape is greater than 0 nm and equal to or smaller than 8.0 nm, and the logarithmic decrement on the back coating layer side is determined by the following method:
securing a measurement sample of the magnetic tape with the measurement surface, which is the surface on the back coating layer side, facing upward on a substrate in a pendulum viscoelasticity tester;
disposing a columnar cylinder edge which is 4 mm in diameter and equipped with a pendulum 13 g in weight on the measurement surface of the measurement sample such that the long axis direction of the columnar cylinder edge runs parallel to the longitudinal direction of the measurement sample;
raising the surface temperature of the substrate on which the measurement sample has been positioned at a rate of less than or equal to 5° C./min up to 80° C.;
inducing initial oscillation of the pendulum;
monitoring the displacement of the pendulum while it is oscillating to obtain a displacement-time curve for a measurement interval of greater than or equal to 10 minutes; and
obtaining the logarithmic decrement Δ from the following equation:

$$\Delta = \frac{\ln\left(\frac{A_1}{A_2}\right) + \ln\left(\frac{A_2}{A_3}\right) + \ldots \ln\left(\frac{A_n}{A_{n+1}}\right)}{n}$$

wherein the interval from one minimum displacement to the next minimum displacement is adopted as one wave period; the number of waves contained in the displacement-time curve during one measurement interval is denoted by n, the difference between the minimum displacement and the maximum displacement of the $n^{th}$ wave is denoted by An, and the logarithmic decrement is calculated using the difference between the next minimum displacement and maximum displacement of the $n^{th}$ wave ($A_{n+1}$ in the above equation).

2. The magnetic tape according to claim 1, wherein the logarithmic decrement is 0.010 to 0.060.

3. The magnetic tape according to claim 1, wherein the thickness of the back coating layer is 0.10 μm to 0.30 μm.

4. The magnetic tape according to claim 1, wherein the full width at half maximum of spacing distribution measured by optical interferometry regarding the surface of the back coating layer before performing a vacuum heating with respect to the magnetic tape is greater than 0 nm and equal to or smaller than 8.0 nm.

5. The magnetic tape according to claim 1, wherein the full width at half maximum of spacing distribution measured by optical interferometry regarding the surface of the back coating layer after performing the vacuum heating with respect to the magnetic tape is greater than 0 nm and equal to or smaller than 8.0 nm.

6. The magnetic tape according to claim 1, wherein the difference $S_{after}-S_{before}$ is greater than 0 nm and equal to or smaller than 6.0 nm.

7. The magnetic tape according to claim 1,
wherein the logarithmic decrement is 0.010 to 0.060,
the thickness of the back coating layer is 0.10 μm to 0.30 μm,
the full width at half maximum of spacing distribution measured by optical interferometry regarding the surface of the back coating layer before performing a vacuum heating with respect to the magnetic tape is greater than 0 nm and equal to or smaller than 8.0 nm,
the full width at half maximum of spacing distribution measured by optical interferometry regarding the surface of the back coating layer after performing the vacuum heating with respect to the magnetic tape is greater than 0 nm and equal to or smaller than 8.0 nm, and
the full width at half maximum of spacing distribution measured by optical interferometry regarding the surface of the back coating layer after performing the vacuum heating with respect to the magnetic tape is greater than 0 nm and equal to or smaller than 8.0 nm.

8. The magnetic tape according to claim 1, wherein the non-magnetic powder included in the back coating layer is one or more kinds of non-magnetic powder selected from the group consisting of inorganic powder and carbon black.

9. The magnetic tape according to claim 8, wherein the content of the inorganic powder in the back coating layer is greater than 50.0 parts by mass and equal to or smaller than 100.0 parts by mass with respect to 100.0 parts by mass of the total amount of the non-magnetic powder included in the back coating layer.

10. The magnetic tape according to claim 1, further comprising:
a non-magnetic layer including non-magnetic powder and a binding agent between the non-magnetic support and the magnetic layer.

* * * * *